US012737481B2

(12) United States Patent
Esbensen et al.

(10) Patent No.: US 12,737,481 B2
(45) Date of Patent: Sep. 15, 2026

(54) MULTIMODAL MEMORY INTEGRATED CIRCUIT WITH NATIVE-SPEED ENCRYPTED DATA PROCESSING FOR USE IN UNBREAKABLE CRYPTOGRAPHY

(71) Applicant: Quantum Properties Technology LLC, Wilmington, DE (US)

(72) Inventors: Daniel M. Esbensen, Hayward, CA (US); Stephen M. Omohundro, Palo Alto, CA (US)

(73) Assignee: QUANTUM PROPERTIES TECHNOLOGY LLC, Wilmington, DE (US)

( * ) Notice: Subject to any disclaimer, the term of this patent is extended or adjusted under 35 U.S.C. 154(b) by 0 days.

(21) Appl. No.: 19/403,500

(22) Filed: Nov. 28, 2025

(65) Prior Publication Data

US 2026/0087155 A1 Mar. 26, 2026

Related U.S. Application Data

(63) Continuation-in-part of application No. 19/364,956, filed on Oct. 21, 2025, which is a continuation-in-part of application No. 18/397,790, filed on Dec. 27, 2023, now Pat. No. 12,476,811.

(60) Provisional application No. 63/868,798, filed on Aug. 22, 2025, provisional application No. 63/541,599, filed on Sep. 29, 2023.

(51) Int. Cl.

| | |
|---|---|
| ***G06F 21/60*** | (2013.01) |
| ***G06F 21/62*** | (2013.01) |
| ***H04L 9/08*** | (2006.01) |

(52) U.S. Cl.
CPC .......... *G06F 21/602* (2013.01); *G06F 21/604* (2013.01); *G06F 21/6227* (2013.01); *H04L 9/0852* (2013.01)

(58) Field of Classification Search
None
See application file for complete search history.

(56) References Cited

U.S. PATENT DOCUMENTS

| | | | | |
|---|---|---|---|---|
| 10,333,708 | B1 * | 6/2019 | Diamant | H04L 9/0631 |
| 10,984,138 | B1 * | 4/2021 | Esbensen | G06F 21/80 |
| 11,108,550 | B1 * | 8/2021 | Esbensen | G06F 21/64 |
| 11,341,254 | B2 * | 5/2022 | Esbensen | G06F 7/582 |
| 11,537,728 | B1 | 12/2022 | Esbensen et al. | G01F 21/602 |
| 11,562,081 | B2 | 1/2023 | Esbensen et al. | G06F 21/60 |
| 2019/0238329 | A1 * | 8/2019 | Leara | G06F 7/58 |
| 2020/0351075 | A1 * | 11/2020 | Griffin | H04L 9/0894 |

(Continued)

*Primary Examiner* — Trang T Doan
(74) *Attorney, Agent, or Firm* — HAYES SOLOWAY P.C.

(57) ABSTRACT

A method of native-speed encrypted data processing for use in cryptography includes the following steps: receiving, from a memory on a chip substrate of a multimodal integrated circuit (IC) chip, a first set of data encrypted by a first OTP key; receiving, from the memory, at least a second set of data encrypted by at least a second OTP key; decrypting the first set of data; processing, by a first externally-originating operation on the at least one processing device, the decrypted first set of data; encrypting the processed first set of data; decrypting the at least second set of data; processing, by at least a second externally-originating operation on the at least one processing device, the decrypted at least second set of data; and encrypting the processed at least second set of data.

18 Claims, 20 Drawing Sheets

(56) References Cited

U.S. PATENT DOCUMENTS

| | | | | |
|---|---|---|---|---|
| 2022/0006796 | A1* | 1/2022 | Steffen | H04L 63/0442 |
| 2023/0044214 | A1* | 2/2023 | Moon | H04L 9/008 |

* cited by examiner 310
370
Remote sensor
4 bits of data: 1100
320
340
Encrypted Data:
332
0110010110...
370
Remote sensor
320
340
Encrypted Data: 1010
332
0000010110...
4 bits of key erased

MULTIMODAL MEMORY INTEGRATED CIRCUIT WITH NATIVE-SPEED ENCRYPTED DATA PROCESSING FOR USE IN UNBREAKABLE CRYPTOGRAPHY

CROSS REFERENCE TO RELATED APPLICATION

This application is a continuation-in-part, and claims the benefit of, U.S. application Ser. No. 19/364,956 entitled "Multimodal Memory Integrated Circuit with Native-Speed Encrypted Data Processing for use in Unbreakable Cryptography" filed Oct. 21, 2025, which is a continuation-in-part and claims the benefit of, U.S. application Ser. No. 18/397,790 entitled, "Multimodal Memory Integrated Circuit for use in Unbreakable Cryptography" filed Dec. 27, 2023, now U.S. Pat. No. 12,476,811, issued Nov. 18, 2025, which claims benefit of U.S. Provisional Application Ser. No. 63/541,599, entitled, "Multimodal Memory Integrated Circuit for use in Unbreakable Cryptography" filed Sep. 29, 2023, and U.S. application Ser. No. 19/364,956 claims the benefit of U.S. Provisional Application Ser. No. 63/868,798 entitled, "Multimodal Memory Integrated Circuit with Native-Speed Encrypted Data Processing for use in Unbreakable Cryptography" filed Aug. 22, 2025, the entire disclosures of which are incorporated herein by reference.

FIELD OF THE DISCLOSURE

The present disclosure is generally related to data security and more particularly is related to multimodal memory integrated circuit with native-speed encrypted data processing for use in unbreakable cryptography.

BACKGROUND OF THE DISCLOSURE

Securing data through encryption is essential to many forms of non-public data, such as military data, governmental data, healthcare information, financial information, corporate data, and others. Various forms of data encryption exist, where the source data is encoded and can only be accessed or decrypted by using a specific key. One-time pad (OTP) is a data encryption technique which is highly secure, and recognized as the most efficient, provably unbreakable form of cryptography. As such, the use of OTP encryption is likely to be integral to data encryption as quantum computing and Artificial General Intelligence (AGI) technologies develop. With AGI technologies in particular, heightened steps are needed to ensure that Artificial Intelligence (AI)-enabled systems are not capable of breaking encryptions that were traditionally secure against non-AI-enabled systems.

While OTP encryption is beneficial, it also has specific requirements which can be viewed as making the use of OTP encryption awkward. For instance, OTP encryption requires an encryption key to be as large as the data being encrypted, such that the size of the encryption key can be significant when a large data set is encrypted. Additionally, OTP requires the prepositioning of keys, e.g., the distribution of the key to the recipient or recipients of the encrypted data in advance. Prepositioning of keys can present challenges with ensuring that the keys themselves remain secure from unauthorized individuals and system.

Secure and efficient distribution of OTP encryption keys remains fundamental to the successful use of OTP encryption. As such, various methods and systems have been used and presented to allow for an encryption key to be prepositioned efficiently and without negatively affecting the security of the OTP encryption method. However, for highly secured data in particular, there still exists concerns relative to trusting the process of key distribution in OTP encryption, and for other cryptographic techniques.

Moreover, the use of OTP encryption can create complications with processing the underlying data. For example, when encrypted data is required to be processed, it is advantageous to first decrypt the data in order to achieve practical and useful processing speeds. Without decryption of the data first, one must rely on fully homomorphic encryption (FHE) techniques, which allow computation on encrypted data without decryption. In FHE, the resulting computations are maintained in an encrypted form which, when decrypted, yields an output that is identical to that of the operations performed on the unencrypted data. However, FHE suffers from performance inefficiencies on the order of 100,000×–1,000,000× slower than plaintext computation, due to large ciphertexts and complex polynomial operations. For example, sorting 10,000 values can take hours or days with FHE versus milliseconds in non-encrypted plaintext.

Thus, a heretofore unaddressed need exists in the industry to address the aforementioned deficiencies and inadequacies.

SUMMARY OF THE DISCLOSURE

Embodiments of the present disclosure provide systems, methods, and devices using a multimodal integrated circuit with native-speed encrypted data processing for use in unbreakable cryptography. Briefly described, in architecture, one embodiment, among others, can be broadly summarized by the following steps: receiving, from a memory on a chip substrate of a multimodal integrated circuit (IC) chip, a first set of data on at least one processing device of the IC chip, the first set of data encrypted by a first OTP key; receiving, from the memory, at least a second set of data on the at least one processing device, the at least second set of data encrypted by at least a second OTP key; decrypting, by the at least one processing device, the first set of data; processing, by a first externally-originating operation on the at least one processing device, the decrypted first set of data; encrypting, by the at least one processing device, the processed first set of data; decrypting, by the at least one processing device, the at least second set of data; processing, by at least a second externally-originating operation on the at least one processing device, the decrypted at least second set of data; and encrypting, by the at least one processing device, the processed at least second set of data.

In one aspect, the method further includes the step of processing together, by at least a third externally-originating operation on the at least one processing device, the processed first and at least second sets of data while the processed first and at least second sets of data are in a decrypted state.

In another aspect, the method further includes the step of introducing, by a fault injection component on the memory, a fault signal to a portion of the memory corresponding to the first set of data or the at least second set of data upon decryption of the first set of data or the at least second set of data, wherein the fault signal corresponds to a threshold access value, and wherein the portion of the memory is configured to zeroize or oneize upon receipt of a threshold number of fault signals.

In another aspect, the first and at least second externally-originating operations are directed to training a machine learning model, and wherein the machine learning model is gradient-isolated.

In another aspect, the method further includes the steps of: generating, by the at least one processing device, an audit log for each of the processed first and at least second sets of data; and encrypting, by the at least one processing device, each audit log using one of the first or at least second OTP keys.

In another aspect, the first and at least second externally-originating operations correspond to encrypted queries from at least one user to access the first and at least second sets of data. In this aspect, the method further includes the steps of: tracking, by the at least one processing device, access to each of the first and at least second sets of data provided to each of the at least one users; and directing, by the at least one processing device, payment from each of the at least one users based on the provided access.

In another aspect, the method further includes the steps of: recording, by the at least one processing device, the first and at least second externally-originating operations; and encrypting, by the at least one processing device, the recorded observations to an observation partition of the memory using an observation OTP key.

In this aspect, the method further includes the step of analyzing, by the at least one processing device, the recorded observations to detect anomalous computation patterns. The present disclosure can also be viewed as providing methods of native-speed encrypted data processing for use in cryptography. In this regard, one embodiment of such a method, among others, can be broadly summarized by the following steps: receiving, from a memory on a chip substrate of a multimodal integrated circuit (IC) chip, a first set of data on at least one processing device of the IC chip, the first set of data encrypted by a first OTP key; receiving, from the memory, at least a second set of data on the at least one processing device, the at least second set of data encrypted by at least a second OTP key; decrypting, by the at least one processing device, the first set of data and the at least second set of data; processing, by a first externally-originating operation on the at least one processing device, the decrypted first and at least second sets of data; and encrypting, by the at least one processing device, the processed data.

In one aspect, the first and at least second sets of data correspond to intervals of time.

In another aspect, the first and at least second sets of data correspond to security access tiers, and the method further comprises the step of identifying, by the at least one processing device, a security access tier of the first set of data and a security access tier of the at least second set of data, wherein decrypted data having a lower privilege security access tier is prevented from operating on decrypted data having a higher privilege security access tier.

In this aspect, the method further comprises the steps of: identifying, by the at least one processing device, a security access tier of the processed data; and restricting, by the at least one processing device, an output of the processed data based on the identified security access tier.

The present disclosure can also be viewed as providing methods of in-circuit quantum key distribution. In this regard, one embodiment of such a method, among others, can be broadly summarized by the following steps: generating, by a truly random number generator (TRNG) stored on a memory on a chip substrate of a multimodal integrated circuit (IC) chip, key bits corresponding to an in-circuit OTP key; storing, in the memory, the key bits of the in-circuit OTP key; receiving, from a first partition of the memory, a first set of data on at least one processing device of the IC chip, the first set of data encrypted by a first OTP key; encrypting, by the at least one processing device, the first set of data using the in-circuit OTP key; decrypting, by the at least one processing device, the first set of data using the first OTP key; encrypting, by the at least one processing device, the first set of data using a second OTP key; decrypting, by the at least one processing device, the first set of data using the in-circuit OTP key; and storing, on a second partition of the memory, the first set of data encrypted by the second OTP key.

In one aspect, the method further includes the steps of: receiving, from the second partition of the memory, a second set of data on at least one processing device of the IC chip, the second set of data encrypted by the second OTP key; encrypting, by the at least one processing device, the second set of data using the in-circuit OTP key; decrypting, by the at least one processing device, the second set of data using the second OTP key; encrypting, by the at least one processing device, the second set of data using the first OTP key; decrypting, by the at least one processing device, the second set of data using the in-circuit OTP key; and storing, on the first partition of the memory, the second set of data encrypted by the first OTP key.

Embodiments of the present disclosure provide a multimodal integrated circuit chip with native-speed encrypted data processing for use in cryptography. Briefly described, in architecture, one embodiment, among others, can be implemented as follows. A multimodal integrated circuit (IC) chip with native-speed encrypted data processing for use in cryptography includes a chip substrate. A memory is positioned on the chip substrate. When key bits from key data are stored on the memory, unauthorized access of the key bits is prevented. A plurality of partitions is formed within the memory. At least one partition is encrypted. At least one processing device is positioned on the chip substrate. The at least one processing device prohibits access of the at least one encrypted partition by at least one other partition without an externally-originating verification operation.

In one aspect, the plurality of partitions within the memory correspond to a cognitive process of an Artificial General Intelligence (AGI). The cognitive process comprises perception, reasoning, action, and self-modification.

In this aspect, a partition corresponding to reasoning is prohibited by the at least one processing device from accessing a partition corresponding to action without an externally-originating verification operation.

In this aspect, a partition corresponding to self-modification is prohibited by the at least one processing device from accessing any other partition without an externally-originating verification operation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
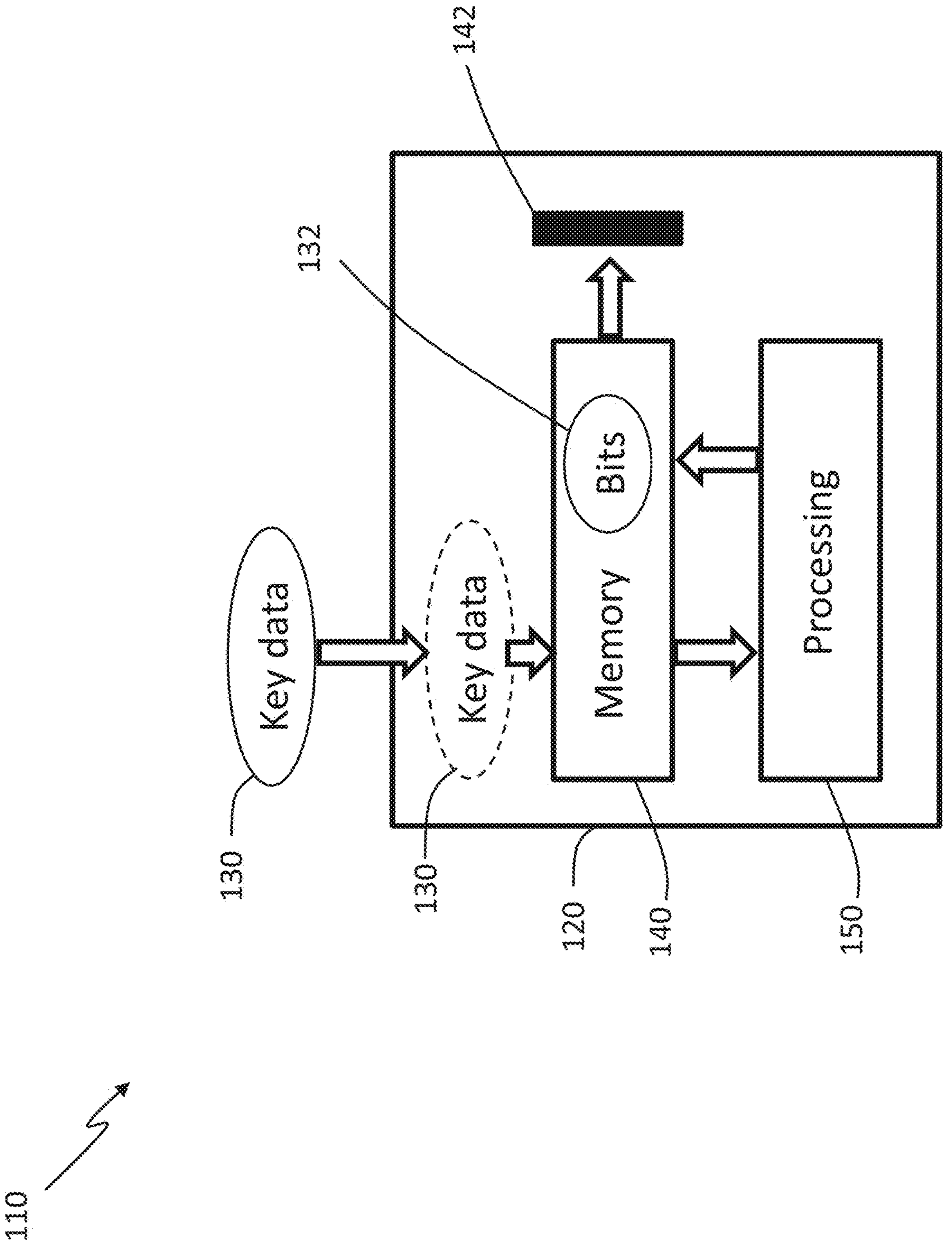
FIG. 1 is a diagrammatical illustration of an improved device for the distribution of cryptographic keys in one example, in accordance with exemplary embodiments of the present disclosure.

In OTP encryption and other forms of encryption, trust relative to the distribution of the key is a highly important consideration for individuals or entities using the encryption technique. For instance, when a product using OTP encryption is manufactured, the manufacturer may distribute the OTP key to a customer, and the customer needs to be able to trust the manufacturer that the key provided by the manufacturer will remain secured. In this scenario, the customer must trust that the manufacturer themselves won't use the key to access encrypted data, but they must also trust the manufacturer's system is not vulnerable to third parties gaining access to the key through the manufacturer's system. Since OTP encryption is used for the very highest security levels, e.g. such as within the government, military, or to encrypt highly confidential or important information, individuals who use OTP encryption are often unwilling to leave any level of security of their encrypted data to the trust of another party, such as the manufacturer of an OPT-enabled device or another party.

To solve this problem and provide efficient, provably unbreakable data security, the present disclosure is directed to hardware devices used in highly secured cryptography. These may include, for instance, multimodal integrated circuits for use in unbreakable cryptography. Additionally, these devices may include improvements in the distribution of cryptographic keys generally, and in particular, OTP keys, where the user of the OTP-encrypted data retains control over the security of the OTP key such that the user can have and maintain a high degree of confidence that the OTP key will remain unbroken. These devices, techniques and systems ultimately allows the user of the OTP encryption to not only have high security OTP keys, but also to be sure that those OTP keys will remain secured before and during their use. The improvements discussed herein may include physical hardware devices, systems, and/or methodologies which allow for an increase of the security of cryptographic keys, but also which will increase a user's trust in the security of the keys used.

Further, the technologies described in the present disclosure can provide significant improvements in countering sophisticated attacks, including eliminating many conventional attack techniques. For instance, as detailed herein, the present disclosure can eliminate the large attack surface all along the encrypted data I/O stream from 'Harvest Now, Decrypt Later' attacks, or similar attacks which rely on a nefarious entity storing encrypted data over an extended period of time and decrypting the data when a future technology solution allows. It is noted that the various improvements may be used independently of one another, or in various combinations, all of which are considered within the scope of the present disclosure.

In one instance, an improvement to the distribution of cryptographic keys may be realized from key bits that are prevented from unauthorized access. In accordance with this disclosure, unauthorized access may be characterized as access to the key bits or a portion thereof where the access is not intended, not desired, or is the result of nefarious activity by an individual or entity.

FIG. 1 is a diagrammatical illustration of an improved device 110 for the distribution of cryptographic keys in one example, in accordance with exemplary embodiments of the present disclosure. In particular, FIG. 1 depicts improvement to the distribution of cryptographic keys may be realized from key bits that prevented from unauthorized access by preventing the key bits from being read from integrated circuit (IC) leads. As shown, FIG. 1 illustrates an IC chip 120 or chip package, which has a structure or chip substrate upon which components are located. The IC chip 120 is enabled to store a cryptographic key. As shown, the IC chip 120 may receive key data 130, and the key bits 132 of the key data 130 are stored in a memory 140 of the IC chip 120, such as within one or more memory cells of the memory 140. Loading the key data 130 with the key bits 132 on the memory 140 may be done when the IC chip 120 is manufactured, or at another point in time prior to use of the IC chip 120, and typically by a manufacturer or producer of the IC chip 120. The memory 140 may be a non-transitory memory device which is positioned on the chip substrate of the IC chip 120. Once stored on the memory 140, a processor 150 or processing system may access the key bits 132 from the memory 140.

In conventional memory ICs, the chip leads, e.g., electrical connectors to and from the IC chip 120, may be used to either read or write to specified memory locations of the IC chip. The device 110 allows for key data 130 to be received and stored on the memory 140, which allows the key bits 132 to be secure, but the IC chip 120 does not physically allow for the key bits 132 of key data 130 to be read out of the IC chip 120 once stored. For instance, the IC chip 120 may be free from chip leads or other structural components which allow key data 130 to be read from the memory 140, such that access to the key data 130 is achieved only through the processor 150 positioned integral with the IC chip 120 itself. Without a physical ability to read data on the memory 140, the key bits 132 are effectively blocked from being read out of the IC chip 120, or otherwise accessed on the memory 140. This is indicated at block 142 in FIG. 1. As such, the key retrieval from the IC chip 120 is impossible. The use of the key bits 132 is in encrypting or decrypting data, but those key bits 132 cannot be otherwise accessed. With the device 110 of FIG. 1, even if an unauthorized person, such as an adversary, has physical access to the IC chip 120 or encryption and decryption hardware which contains the IC chip 120, they are not able to retrieve any bits of the key since the key bits 132 cannot be read from the memory 140 of the IC chip 120.

Figure 2A:
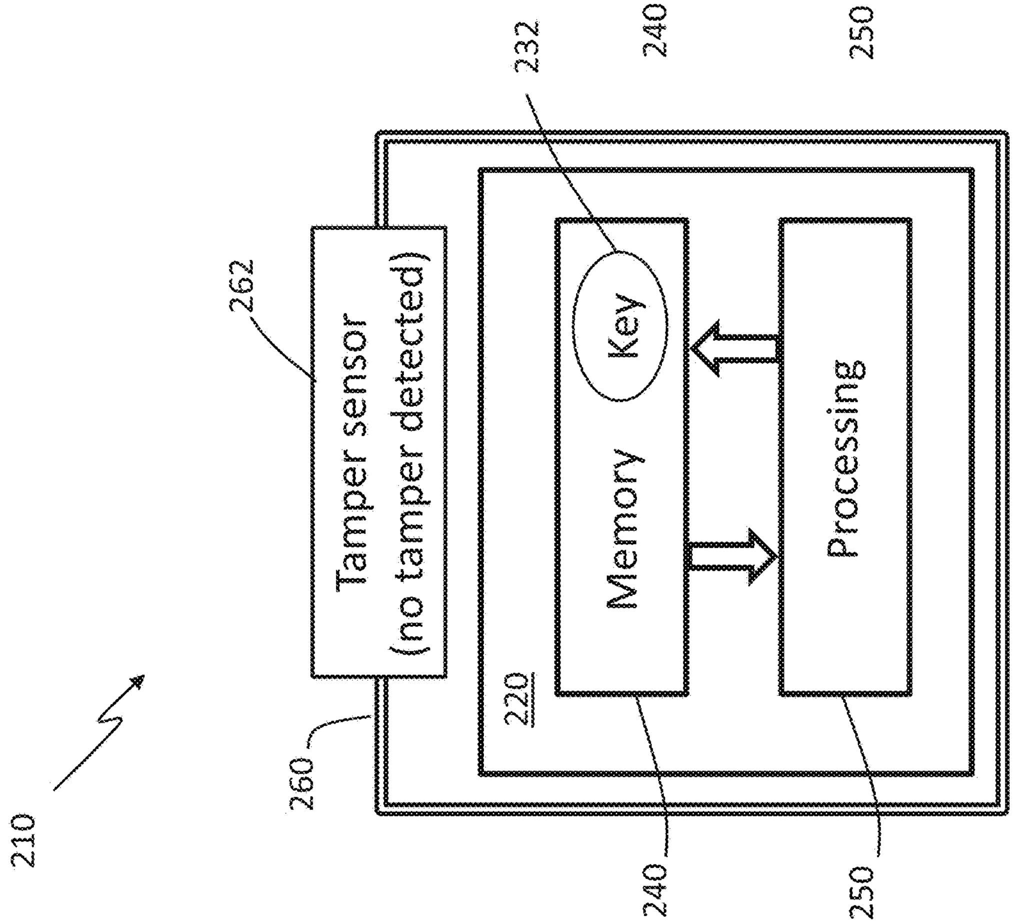
FIGS. 2A-2B are diagrammatical illustrations of a device for distribution of cryptographic keys in one example, in accordance with exemplary embodiments of the present disclosure.
Figure 2B:
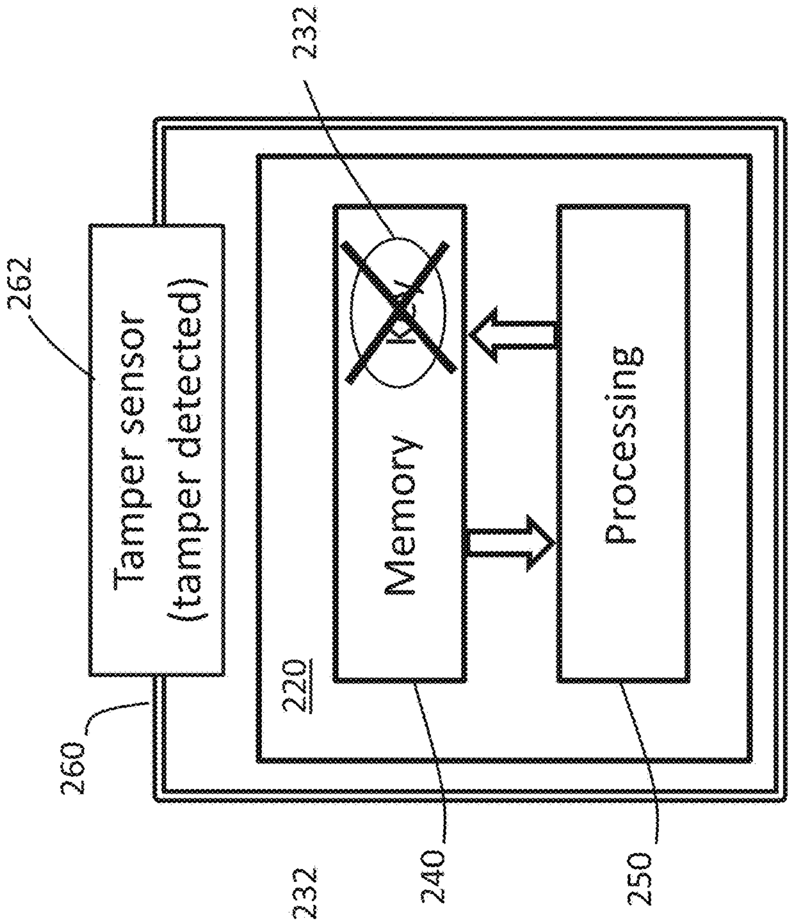

Even with the IC chip 120 which has no physical ability for key data 130 to be read from the memory 140, there still exists a possibility that someone attempts to gain access to the memory 140 from an external system, such as, by adding leads to the memory or otherwise using a technology to tamper with or access the memory 140. To prevent this situation, another improvement to the distribution of cryptographic keys may be realized from tamper-sensitive circuitry which deletes key data upon detection of tampering. FIGS. 2A-2B are diagrammatical illustrations of a device 210 for distribution of cryptographic keys in one example, in accordance with exemplary embodiments of the present disclosure. FIGS. 2A-2B illustrate an IC chip 220 or chip package, which is enabled to store a cryptographic key in the form of key bits 232 which are derived from key data. The key bits 232 are stored in a memory 240 of the IC chip 220, such as within one or more memory cells of the memory 240, as described relative to FIG. 1. Once stored on the memory 240, an integral processor 250 or processing system may access the key bits 232 from the memory 240.

Very sophisticated individuals, entities, or programs may attempt to directly access stored key bits on an integrated circuit by using an electron microscope, etching away portions of the chip, or other highly sophisticated methods. In the device 210, the IC chip 220 may be connected to one or more tamper sensors 262, such as by being positioned within a tamper enclosure 260 which has one or more tamper sensors 262 connected thereto, or otherwise able to sense characteristics of the tamper enclosure 260, as shown in FIG. 2B. The one or more tamper sensors 262 may include sensors which sense or detect a tamper event. The tamper event may be any violation of the integrity of the tamper enclosure 260, or another aspect of the device package, and/or sensing of information or characteristics which can indicate a tamper situation. For instance, sensing changes in temperature, voltage, and other relevant physical environmental variables may be tamper events.

If the tamper enclosure 260 senses the tamper event, indicating the device 210 or memory 240 is tampered with or the device 210 is sensed to be in an environment outside of prescribed bounds, the tamper sensor 262 causes the key bits 232 within the memory 240 to be deleted or otherwise destroyed, such that all stored cryptographic keys are deleted. This situation is depicted in FIG. 2B, where the tamper sensor 262 has detected a condition which evidences a tamper to the tamper enclosure 260 or an environment which is associated with a tamper situation, and thus cause the key bits 232 to be deleted or erased. While this technique will prevent immediate use of the device 210, at least with regards to providing the key data, it maintains cryptographic security even in the face of sophisticated attacks.

It is noted that the technique for causing the key bits 232 within the memory 240 to be deleted or otherwise destroyed may include various techniques for tamper-evident wiping. For instance, in one example a zeroization technique may be used where the key bits are deleted by writing them to zero (or zeroing them), such that all bits associated with the keys are zero. Similarly, a technique may be used to write all bits to one, e.g., “oneizing” the bits or performing “oneization”. Converting all bits to one may have benefits in preventing residual evidence of original bit value, since changing a bit from one to zero can, in some instances, leave a residual indication that the bit was original a one. Other techniques for tamper-evident wiping of the key bits 232 may also be used.

Furthermore, it is noted that tamper-resistant enclosures can be used specifically with hardware devices, such as a multimodal IC chip, which together can be used to ensure unbreakable encryption of data, even in the presence of artificial intelligence (AI) computing. For instance, with the popularity of AI computing, there is a growing concern for how AI and artificial general intelligence (AGI) systems can be controlled. It has been recognized that AGI systems cannot be controlled with human-based or software-based security systems, since the AGI system itself can modify or manipulate humans or software. AGI system can only be controlled with a hardware-level encryption device or method, such as the systems and methods described herein, where it is possible to be absolutely sure that the hardware can hold encrypted information since the hardware can delete encrypted information in the event that tampering is detected. This type of device or method, therefore, will have increasing importance to the use and control of AI and AGI systems used in the future.

Figure 3B:
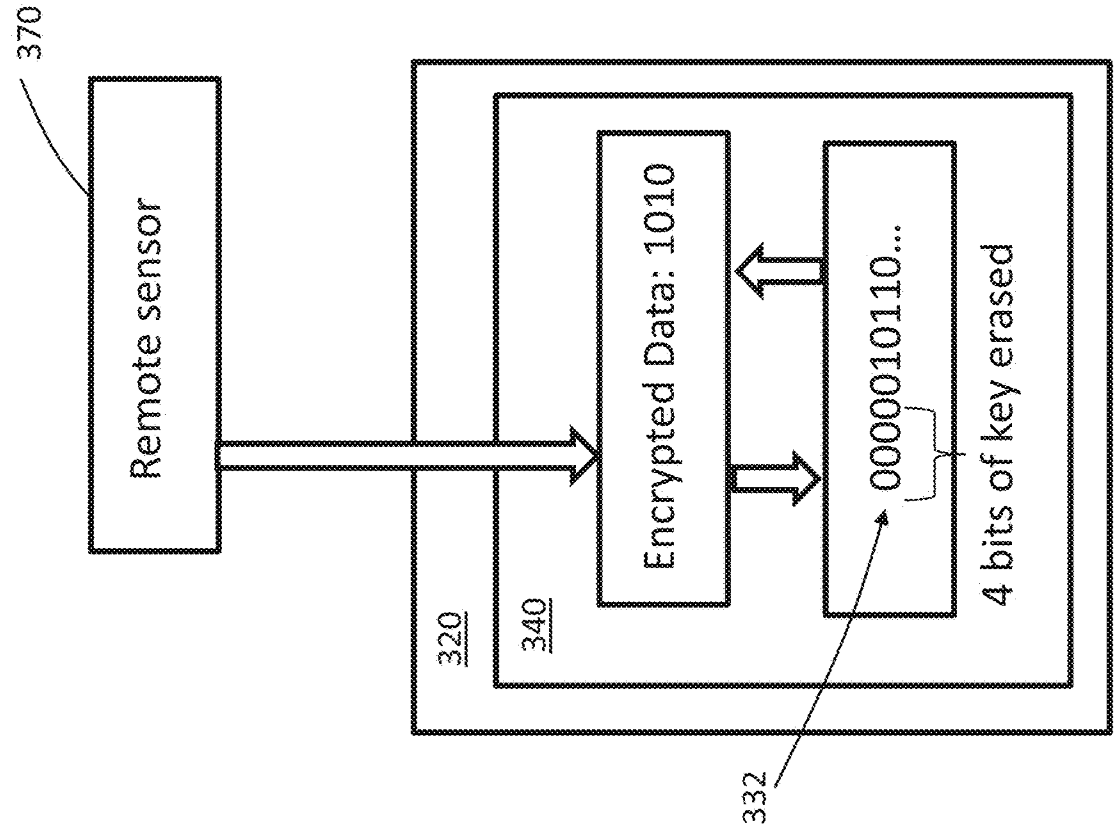
FIGS. 3A-3B are diagrammatical illustrations of a device for distribution of cryptographic keys in one example, in accordance with exemplary embodiments of the present disclosure.
Figure 3A:
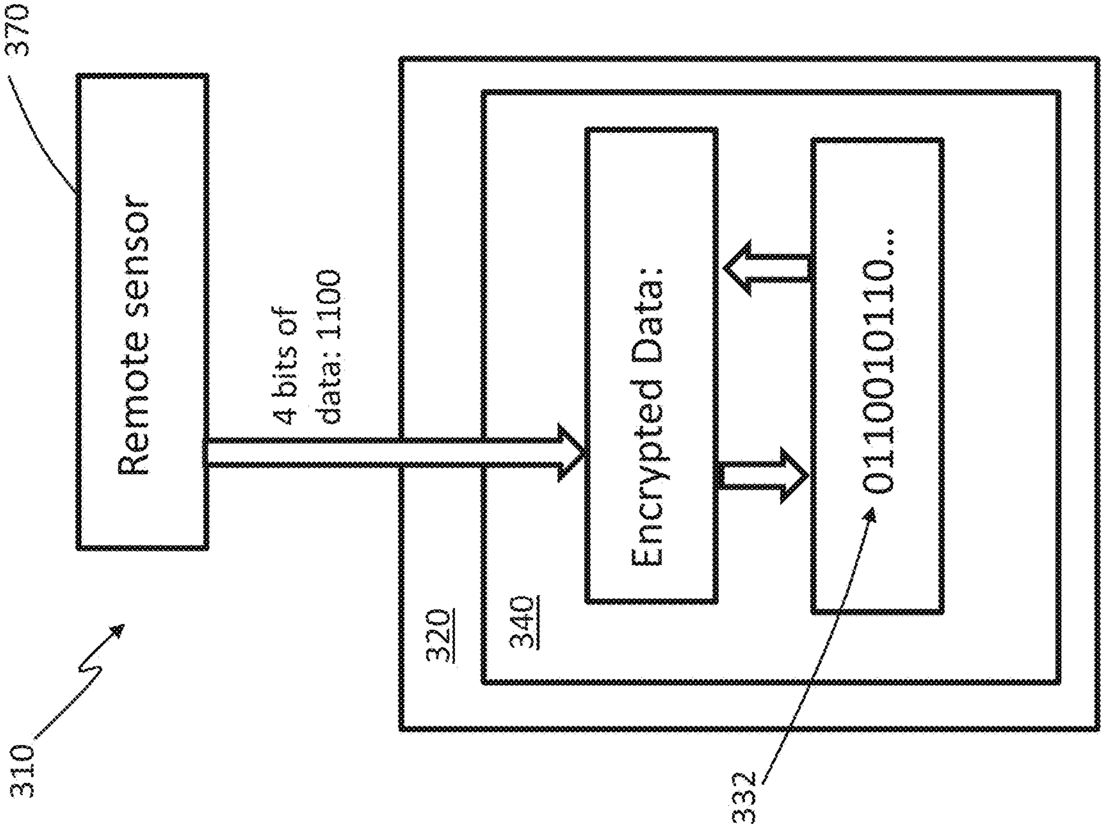

In another example, another improvement to the distribution of cryptographic keys may be realized from key bits that are deleted as they are used. For example, many applications of quantum cryptography may involve remote sensing devices, such as video cameras, or other sensing devices, which are recording environmental information. This information may be captured, then encrypted, and then the encrypted data may be stored. FIGS. 3A-3B are diagrammatical illustrations of a device 310 for distribution of cryptographic keys in one example, in accordance with exemplary embodiments of the present disclosure, where an IC chip 320 or chip package, which is enabled to store this captured data on a memory 340. The memory may store the captured data retrieved from a remote sensing device 370, such as a video camera, as shown in FIG. 3A. In this example, the captured data is 4 bits of data depicted as "1100".

To encrypt the captured data, the device 310 may retrieve a portion of the bits 332 of the cryptographic key stored on the memory 340 and use it to encrypt the captured data, as shown in FIG. 3B. The result is stored on the memory 340 and the key bits 332 used for the encryption are deleted. This technique ensures that no unencrypted information remains on the device 310. If a hostile party obtains the remote sensor device 370, it is mathematically impossible for them to reconstruct the stored sensor information. It is noted that this same process may occur within the decryption device during decryption. As the encrypted information comes into the decryption device, it is combined with the stored cryptographic key to form the decrypted message and the used bits of the key are deleted. This helps ensure that the cryptographic key cannot be extracted from the device.

In other examples, heightened encryption and trust of encrypted keys can use an encryption module which stores encryption keys. The encryption module may include an electro-computerized device having at least a non-transitory memory. The encryption module may be provided by an encryption module provider, which is generally an entity which provides the encryption module, but more specifically, will often be a corporate or governmental entity which is in the business of providing an encryption module. In one example, an encryption module provider may provide two or more encryption modules containing identical key bits to end users. This allows the parties using these encryption modules to communicate securely with one another from remote distances, since both parties have the encryption keys to decrypt encrypted data.

Figure 4:
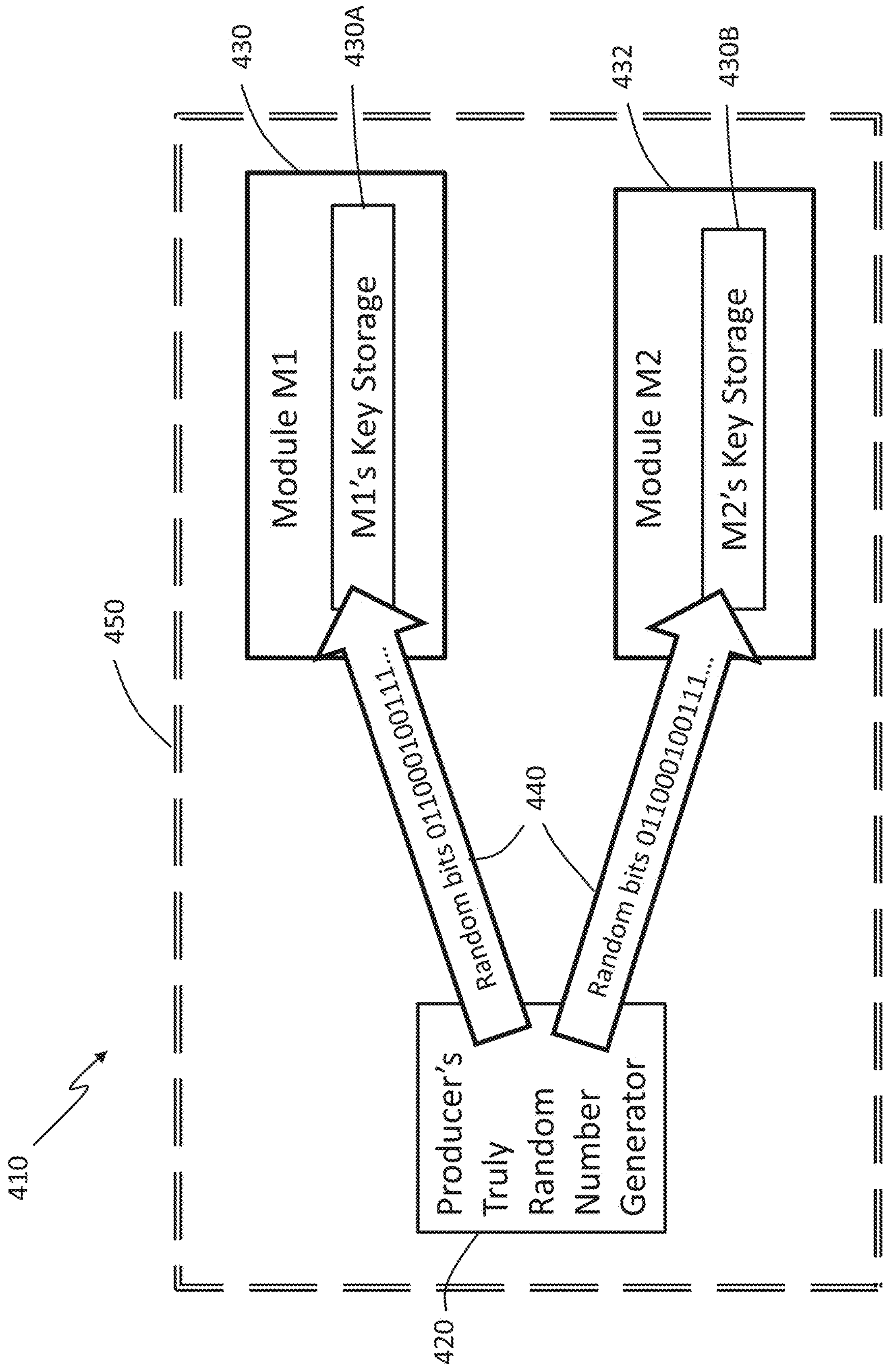
FIG. 4 is a diagrammatical illustration of a device for distribution of cryptographic keys in one example, in accordance with exemplary embodiments of the present disclosure.

One example of the distribution of cryptographic keys may be realized from a module producer key load process to two or more linked modules, as shown in FIG. 4, which is a diagrammatical illustration of a device 410 for distribution of cryptographic keys in one example, in accordance with exemplary embodiments of the present disclosure. In the most basic form of this example, the producer of an encryption module must be trusted. As shown in FIG. 4, the module producer possesses a reliable truly random bit generator 420. The encryption module producer may produce sets of linked hardware encryption/decryption modules, such as module M1 430 and module M2 432, but any number of modules may be used. The provider uses generator 420 to generate the random key bits 440 which are stored in key storage units 430A, 430B in each of module M1 430 and module M2 432, respectively, and in any other Mn modules.

It may be important that this process of adding random key bits 440 on to the modules 430, 432 be secret to the provider themselves, and it should be accomplished in a Faraday cage 450, unconnected to any networks. The Faraday cage 450 may be an enclosure which is capable of blocking electromagnetic fields. Additionally, in one example the only storage of the key bits should be in the desired modules 430, 432, such that the modules 430, 432 do not include other data. Thus, in this simplistic example, the desired number of modules 430, 432 may be loaded with key bits and are distributed to the end users.

In other examples, it may be more beneficial to also include ancillary data about the encryption. For instance, it may be valuable to also store metadata about the key including the identity of the encryption module producer, the serial number of the production equipment, the number of bits produced, and the number of modules loaded with the key, among other possible data. This may allow the user to ensure that the number of modules with the key is the number of modules in their possession and that they are physically intact.

Further, the example of FIG. 4 may require the end users to trust the encryption module providers not to have hacked their key production hardware to store additional sanctioned copies of the key. This risk can be reduced by auditing the encryption module producer's equipment.

It is also noted that the specific form of the encryption module and other production equipment may be beneficial to the technique disclosed herein. For instance, the random key generator 420 of the encryption module producer, and all the modules to be loaded may be contained in a tamper sensing environment, such as is disclosed relative to FIGS. 2A-2B. This loading environment may be encased in a Faraday cage 450 to prevent any signals containing the stored bits from escaping the location where they are loaded onto the modules. Cameras or other sensing or data capture devices can be used to record the process of loading the key bits 440 showing the devices isolated in the tamper-resistant enclosure and the video may serve as part of the key provenance for the customer or end user. Additionally, the producer may attest that the key loading process was accomplished within the secure enclosure without violating the seals and protection mechanisms to prevent any access to the generated key bits 440 during the process of loading.

Once loaded into the devices 410, there may be no access to the cryptographic key bits 440 through the leads of the devices 410, as discussed relative to FIG. 1, for instance. As one of many alternative implementations of this process, it may be possible to use a random bit generator included as a part of one of the modules 430, 432 which then generates the key bits 440 loaded into the other modules, e.g., Mn.

The module producer key load process described relative to FIG. 4 is highly reliable and secure for the end user as long as they trust the cryptographic device producer to have carried out the process correctly and to have not violated the security integrity of the load process environment. However, the end user may use a secondary key update process, which may be performed by the end user. This process may further enhance the security of the key from the module producer, but it also may be used to eliminate the need for any trust of the original device producer.

Figure 5:
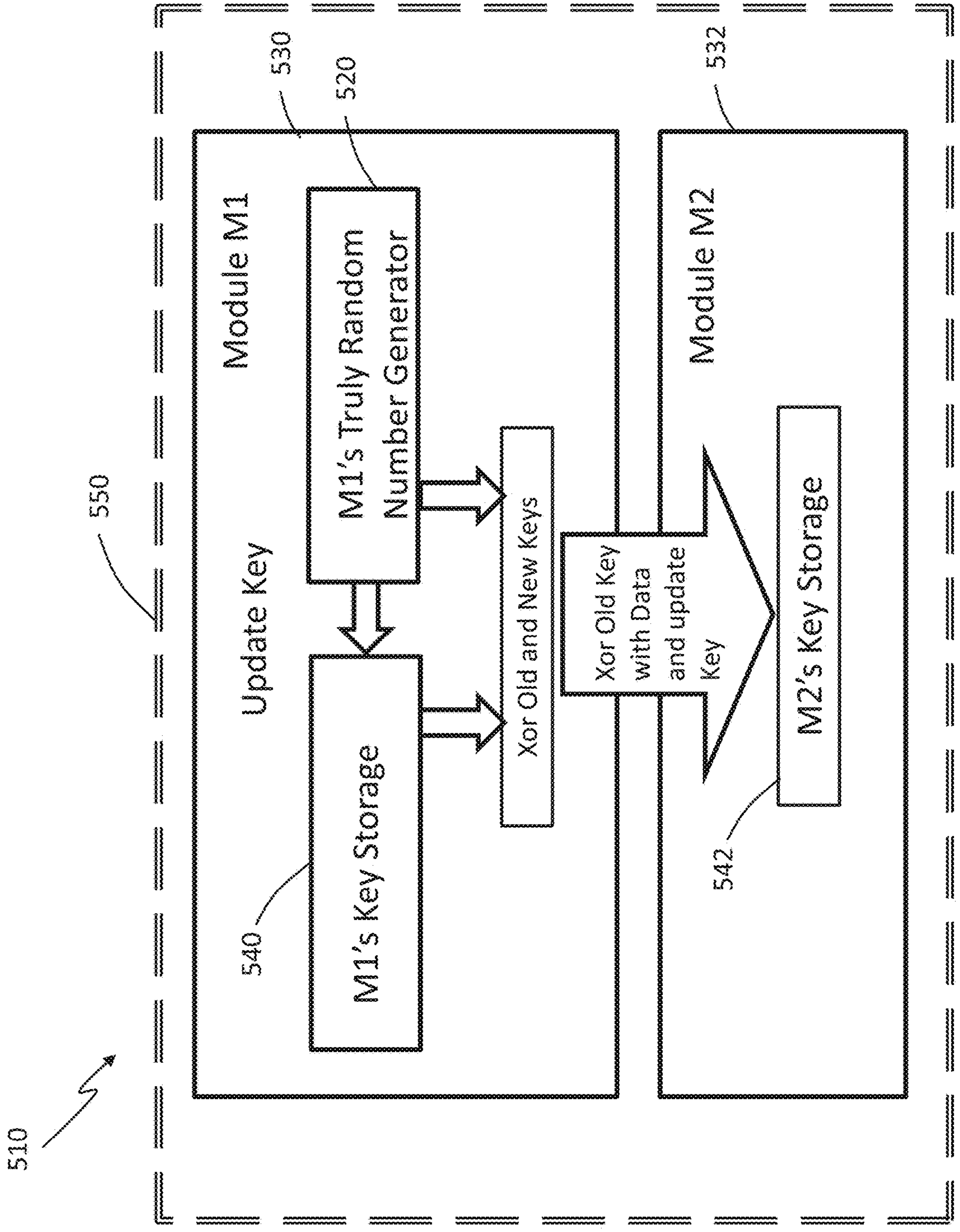
FIG. 5 is a diagrammatical illustration of a device for distribution of cryptographic keys in one example, in accordance with exemplary embodiments of the present disclosure.

As shown in FIG. 5, which is a diagrammatical illustration of a device 510 for distribution of cryptographic keys in one example, in accordance with exemplary embodiments of the present disclosure, the end user of the encryption key has a secure, tamper-resistant Faraday cage 550 which provides a protected environment for updating the two or more modules M1, M2, 530, 532 with identical keys and identical key bits loaded onto them.

One of the devices or modules is selected as the "master", e.g., module M1, 530 in FIG. 5, and it has an onboard random number generator 520 which is used to update its own key bits and the keys of the other devices in its group, e.g., other modules such as M2. With the modules M1 and M2, in this example, connected inside the secure secondary process environment of the Faraday cage 550, the master device M1 may generate the new random key. This new random key is stored in the key memory 540 of the module M1, 530, and the random key is encrypted using the module producer key. In other words, the key bits originally provided by the entity producing the modules 530, 532 is encrypted, such as using an Xor process, with the new key bits generated from the onboard TRNG of the module M1 530. Thus, a two-step encryption process is used where the original key bits are further encrypted with a secondary set of key bits which are derived from the module M1 530 itself. This two-step encrypted key may then be sent to each of the other modules, such as module M2, 532 or any other Mn modules. Each other module receives the encrypted new key, decrypts it using the stored module producer key, and stores the new key in its memory 542.

The end result of the process described relative to FIG. 5 is that each module 530, 532 has the same new random key. This key has never been exposed on any module lead. The end user can be absolutely sure that the module producers have no information about the new key, since it was generated on the modules themselves after they were in the control of the end user. As such, the end user can have absolute trust in its security. Additionally, no employee of the user or other individual can have access to the new key either since it is encrypted. Even if someone were to surreptitiously record all of the leads connecting modules during the secondary key update process, the key bits never appear unencrypted. This allows the end user to fully trust both the original producer and their own employees involved in the update process.

Figure 6:
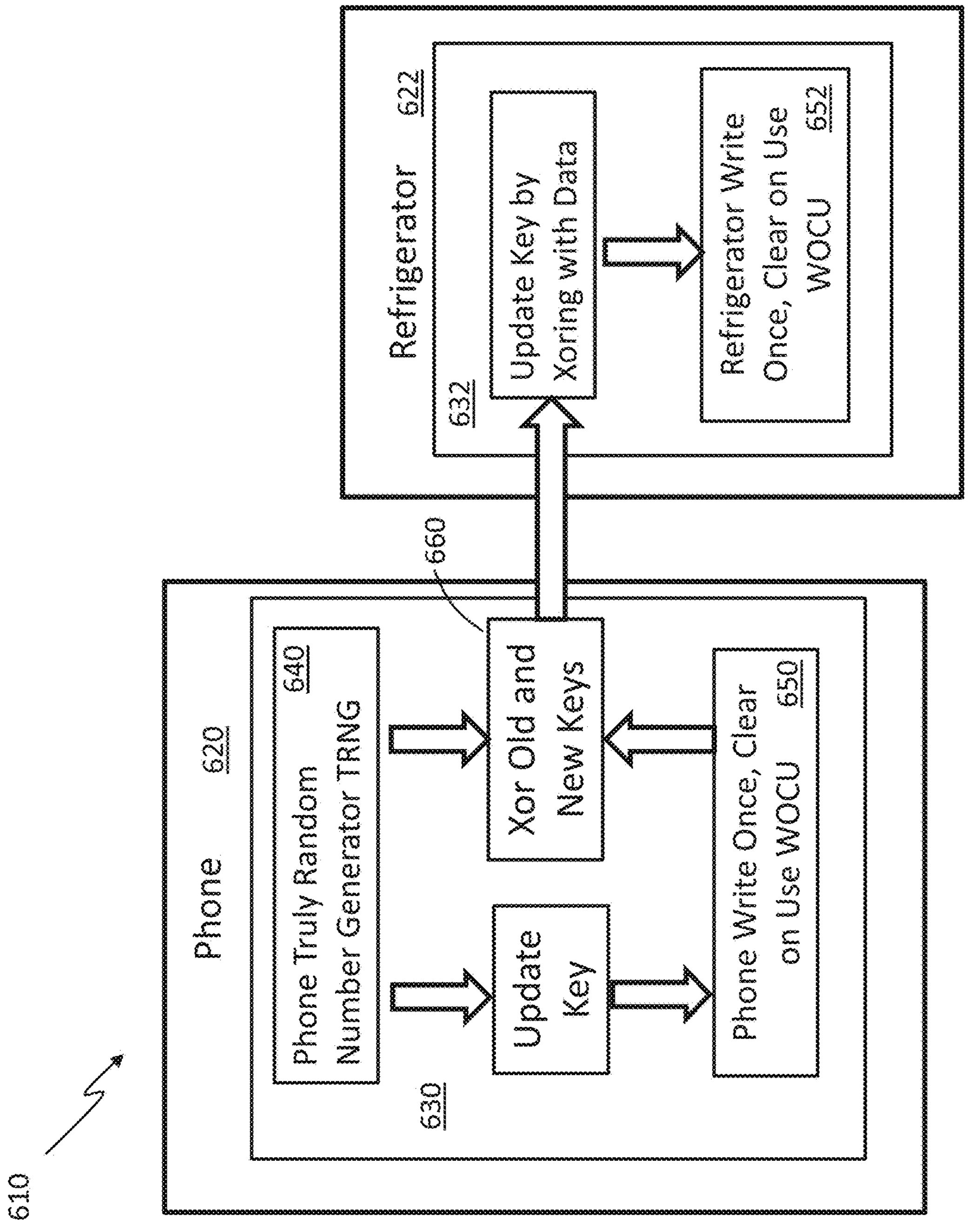
FIG. 6 is a diagrammatical illustration of a key distribution process between two IoT devices, in one example, in accordance with exemplary embodiments of the present disclosure.

FIG. 6 is a diagrammatical illustration of a key distribution process 610 between two IoT devices, in one example, in accordance with exemplary embodiments of the present disclosure. As shown, two or more IoT-enabled devices may be provided, where a device such as a smart phone 620 may electronically pair with another device, such as a refrigerator 622. Any other type of IoT or non-IoT-enabled devices may also be used, all of which are within the scope of the present disclosure. The phone 620 may have an encryption chip 630 which has both a truly random number generator (TRNG) 640 and a "Write Once, Clear on Use" (WOCU) circuit 650. The refrigerator 622 also has a WOCU circuit 652 on its chip 632. As delivered from the manufacturer, the phone 620 and refrigerator 622 may arrive with the manufacturers or producer generated key.

During the pairing process between the phone 620 and the refrigerator 622, the phone 620 generates a new key using the TRNG generator 640 and stores the new key in the phone's WOCU memory 650. The new key is then transmitted to the refrigerator 622 along with the key from the manufacturer. Both keys may be transmitted in an encrypted state, such as by using an Xor process. This is shown at block 660. The refrigerator 622 receives the encrypted key, decrypts it with the stored producer's key, and stores the new key in its WOCU circuit 652. The phone 620 and the refrigerator 622 now have the same key which has never been exposed on any wire in either the phone 620 or the refrigerator 622, or in the Bluetooth signal or other communication signal between them. The two devices may communicate with full confidence of unbreakable security.

Once pairing has completed the refrigerator 622 will only accept OTP encrypted commands from the phone 620 and the phone 620 will only accept OTP encrypted responses from the refrigerator 622. Since the WOCU chips 650, 652 contain enough bits for the lifetime of pairing, the refrigerator 622 cannot be hacked even when connected to the Internet, or another accessible network.

Figure 7:
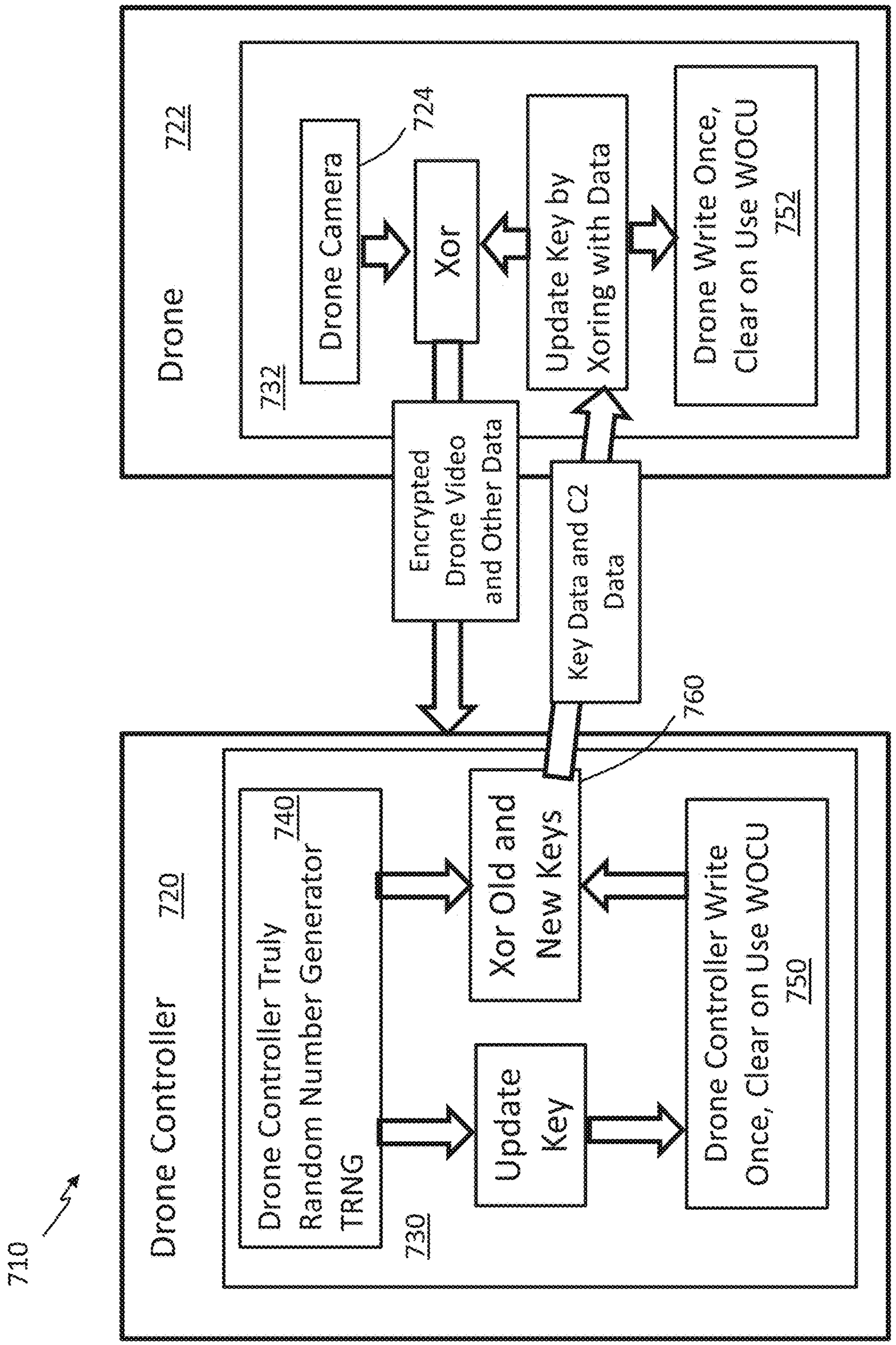
FIG. 7 is a diagrammatical illustration of a key distribution process between command and control devices, in one example, in accordance with exemplary embodiments of the present disclosure.
Figure 8A:
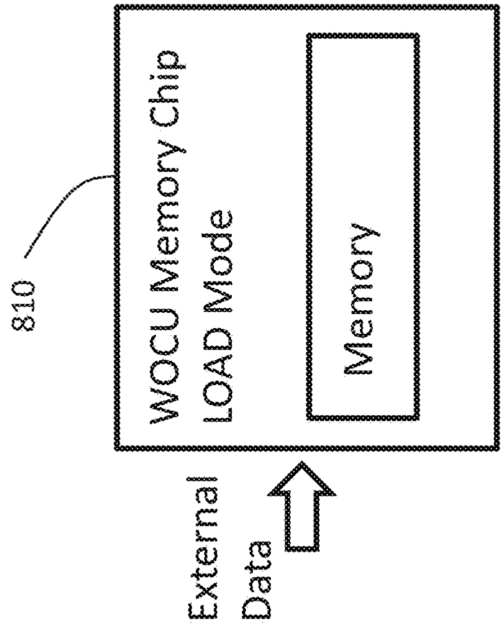
FIGS. 8A-8D are diagrammatical illustrations of a WOCU memory chip, in one example, in accordance with exemplary embodiments of the present disclosure.
Figure 8B:
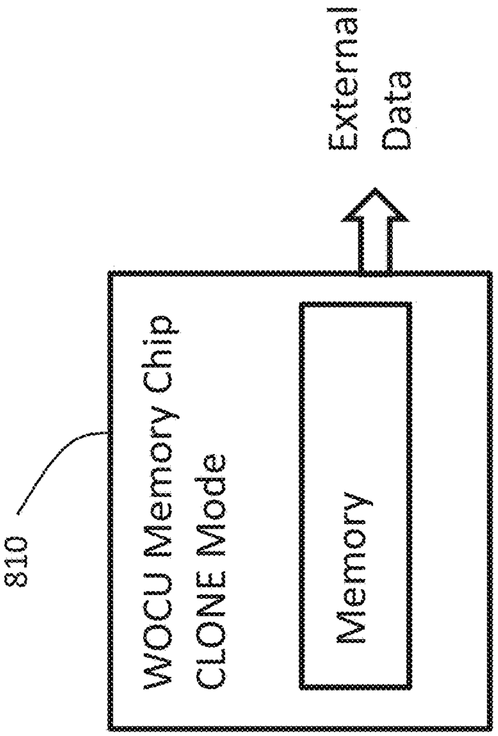
Figure 8C:
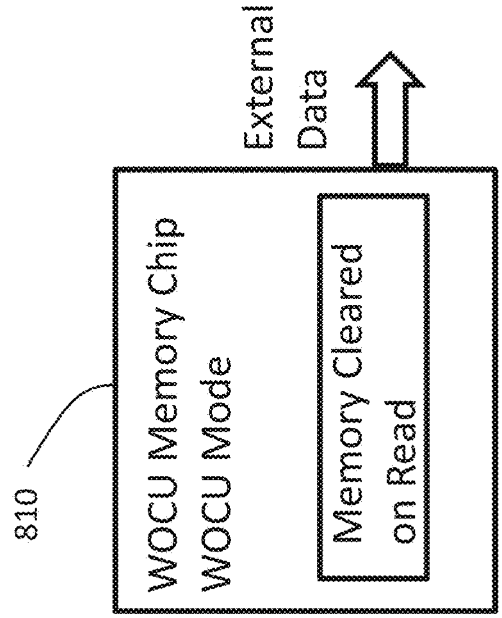
Figure 8D:
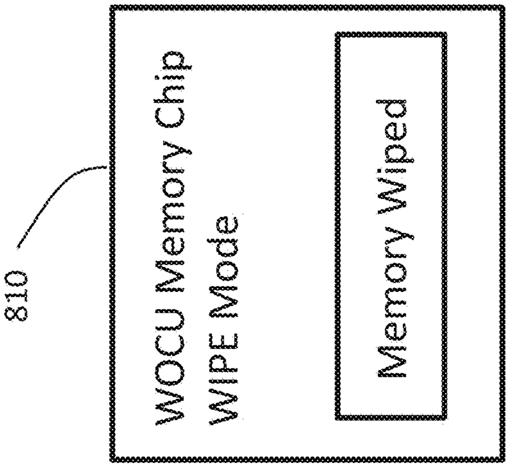

Key distribution may be further enhanced for command and control devices, such as, for instance, remote, electronic controllers for devices such as drones. To this end, FIG. 7 is a diagrammatical illustration of a key distribution process 710 between command and control devices, in one example, in accordance with exemplary embodiments of the present disclosure. For instance, in one example, a drone controller 720 may electronically pair with a drone 722. The drone controller 720 may have an encryption chip 730 which has both a TRNG 740 and a WOCU circuit 750. The drone 722 also has a WOCU circuit 752 on its chip 732. The drone controller 720 and drone 722 may be manufactured with a generated key.

During the pairing process between the drone controller 720 and the drone 722, the drone controller 720 generates a new key using the TRNG generator 740 and stores the new key in the drone controller's 720 WOCU memory 750. The new key is then transmitted to the drone 722 along with the key from the manufacturer. Both keys may be transmitted in an encrypted state, such as by using an Xor process, as shown at block 760. In addition to the keys, additional data may be transmitted in an encrypted state, such as command and control (C2) data, or other data that is desired to be transmitted to the drone 722. The drone 722 receives the encrypted key, decrypts it with the stored producer's key, and stores the new key in its WOCU circuit 752. The drone controller 720 and the drone 722 now have the same key which has never been exposed by either the drone controller 720 or the drone 722, or in the communication signal between them. The two devices may communicate with full confidence of unbreakable security.

As can be seen, this process between a drone controller 720 and the drone 722 may use the same method of TRNG bit generation, WOCU storage, and transmission during pairing as described relative to previous figures, and it may work successfully for drones and all IoT devices that require unbreakable security.

In addition, a sensor on the drone 722, such as a drone camera 724, may capture data which can be encrypted using an Xor process with the updated key. This may allow the drone 722 to transmit encrypted drone video or images, or other captured data such as telemetric data about the drone and other data which relates to the drone or an operation thereof, or information otherwise captured by the drone, back to the drone controller 720 in an encrypted state. It is further noted that the encrypted data transmitted to or from the drone 722 and the drone controller 720 may also include command and control data, such as the control signals for controlling operation of the drone 722 itself. The technology described herein can be used with conventional drones, such as drones operating in aerial environments, on the land, or in other settings, but it is also possible to use the same encryption techniques for satellite systems in orbit. Indeed, many satellite systems lack significant security protocols, such that the technology described herein can be implemented in new satellites and adopted for existing satellites to ensure that all data communicated to and from satellite systems can be kept secure.

Relative to both FIGS. 6-7, since corresponding WOCU bits are cleared upon use, neither the phone, or the IoT device, or the drone controller, or drone can be hacked while in use or to discover previously sent commands or information.

FIGS. 8A-8D are diagrammatical illustrations of a WOCU memory chip 810, in one example, in accordance with exemplary embodiments of the present disclosure. As shown, the memory chip 810 with WOCU may have at least four selectable modes for OTP applications. These modes include: a load memory from an external source (LOAD mode), FIG. 8A; a clone memory to an external source (CLONE mode), FIG. 8B; a clear on read mode, any memory read is immediately cleared (WOCU mode), FIG. 8C; and a wipe mode where all memory data is wiped (WIPE mode), FIG. 8D.

The use of the WOCU memory chip 810 in OTP encryption applications may include the following steps:

1. Initially the chip is put into LOAD mode and loaded with truly random bits from an external source
2. Next the chip is put into CLONE mode and copied to another WOCU chip that is in LOAD mode
3. During use, the chip is put into WOCU mode to encrypt data using OTP encryption, as data is encrypted using the bits in the chip's memory, those memory locations on the WOCU chip are cleared
4. Later, the encrypted data is decrypted using the CLONED WOCU chip. In fact, without the cloned WOCU chip, it may be impossible to decrypt the data.

Additionally, for added security, the WOCU memory chip 810 may be put onto a "tamper evident" board or chip, such as previously described, where any tampering of the board trips the WIPE mode of the WOCU chips on the board. It is noted that WOCU memory chips 810 can be on motherboards, daughter boards, or even USB devices. WOCU memory chips 810 can also be loaded and cloned as pairs at a factory and sold as pairs or this can be done on a motherboard.

Relative to any example of this disclosure, it is noted that key data with key bits may be stored on a memory of the IC chip or in a module, where the key data includes a large number of key bits which can be used for multiple encryption and decryption processes. For instance, the key data may include 100,000 bits where key bits used for a particular encryption and decryption process may include only 1,000 bits. As such, a key loaded on the memory may be used multiple times, but the key bits within the key are used only once, as required by OTP encryption. When the particular key bits are used for encryption or decryption and data is transferred between devices, the key bits themselves may not be transferred, but rather, the key bits may be identified with a bit offset, which is a positional address of the block of random bits within all of the random bits of the key data. For instance, the bit offset may be a numerical address where a certain number of bits within a certain location, such as by line or column, were used for encryption of the source data. In one example, the bit offset may be data that indicates bits 501 through 1000 were used for the encryption, or that the block of bits starts at 1,001 and 500 bits were used.

Figure 9:
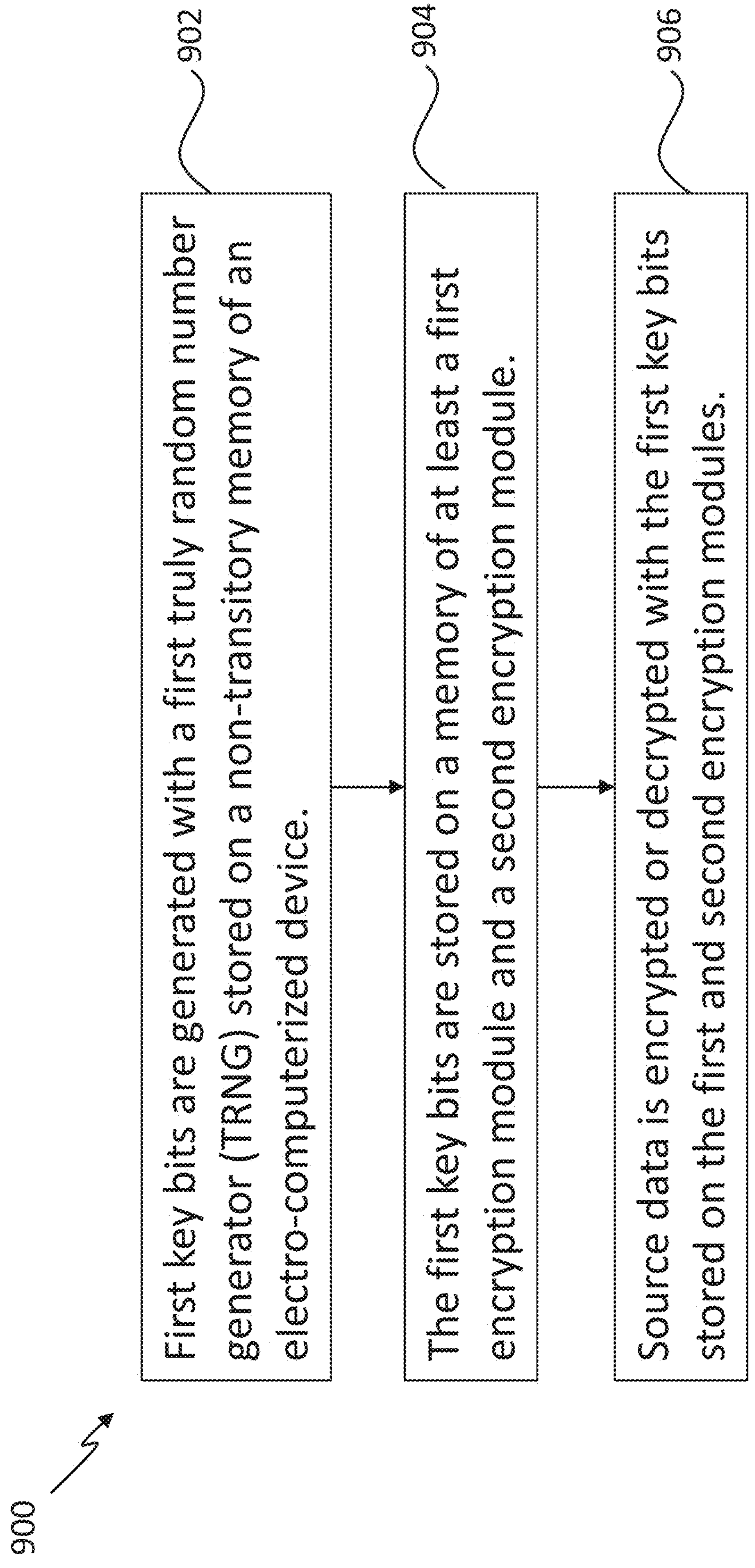
FIG. 9 is a flowchart illustrating a method of providing secure data encryption, in accordance with the embodiments of the disclosure.

FIG. 9 is a flowchart 900 illustrating a method of providing secure data encryption, in accordance with the embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 902, first key bits are generated with a first TRNG stored on a non-transitory memory of an electro-computerized device. The first key bits are stored on a memory of at least a first encryption module and a second encryption module (block 904). Source data is encrypted or decrypted with the first key bits stored on the first and second encryption modules (block 906). Any number of additional steps, functions, processes, or variants thereof may be included in the method, including any disclosed relative to any other figure of this disclosure.

As detailed herein, OTP encryption is provably unbreakable when keys are truly random, never reused, and kept secret. The multimodal IC chip described relative to FIGS. 1-9 provides secure key storage, tamper detection, and WOCU memory to ensure OTP keys could never be retrieved outside secure hardware. However, this secure storage can cause inefficiencies when computations on the encrypted data are required, since one is forced to either decrypt the data first, which can negate the secure storage in the first place, or use FHE techniques which operate at excruciatingly slow speeds compared to plaintext computation due to large ciphertexts and complex polynomial operations. Moreover, FHE relies on computational encryption, which, unlike OTP encryption, has no proof of being mathematically unbreakable. Thus, a need exists for a system that preserves the OTP principle of never exposing plaintext outside the chip, while eliminating the FHE performance penalty by performing OTP decryption, computation, and re-encryption entirely within a tamper-resistant enclave.

The present disclosure is directed to tamper-resistant secure modules capable of performing OTP encryption and decryption, along with plaintext computation, entirely within a secure enclave containing an integrated central processing unit (CPU) and/or field programmable gate array (FPGA) circuitry for near-native-speed processing. This allows for efficient processing and computation of encrypted data without risk of a breach of security of the data and without lengthy computation processes, such as is seen with FHE.

Figure 10A:
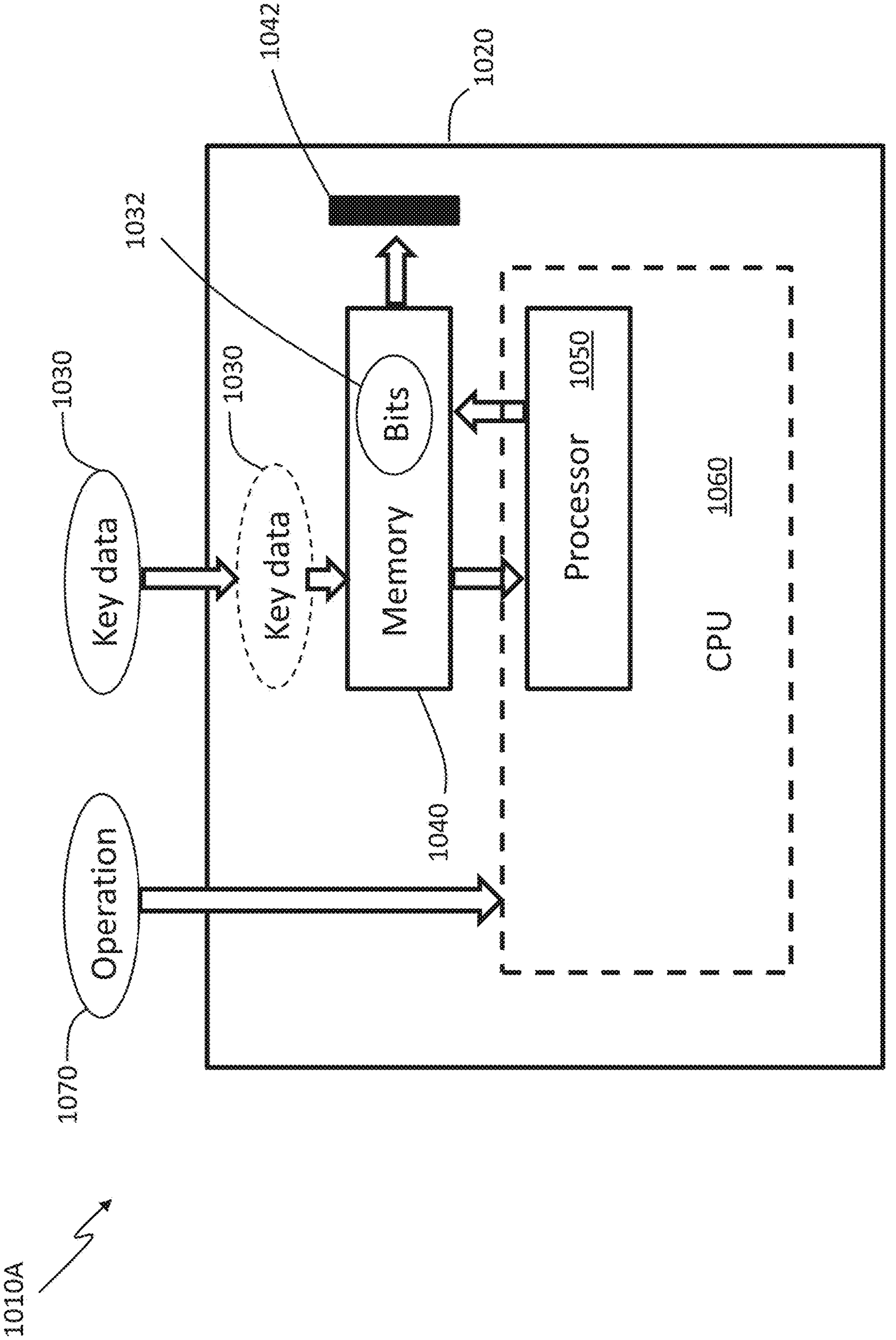
FIG. 10A is a diagrammatical illustration of an improved multimodal IC chip with an integrated CPU, in accordance with embodiments of the present disclosure.
Figure 10B:
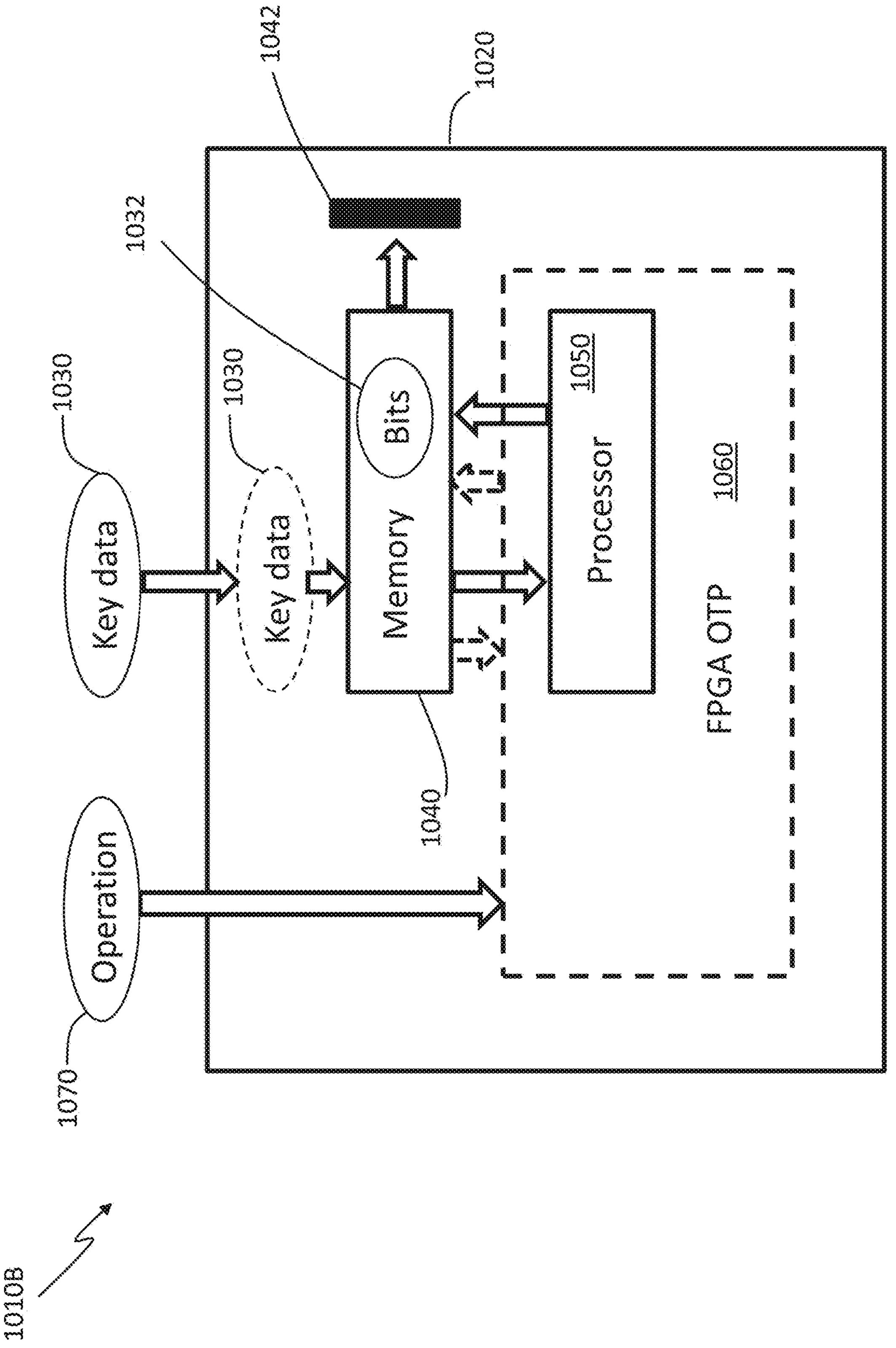
FIG. 10B is a diagrammatical illustration of an improved multimodal IC chip with an integrated FPGA, in accordance with embodiments of the present disclosure.
Figure 10C:
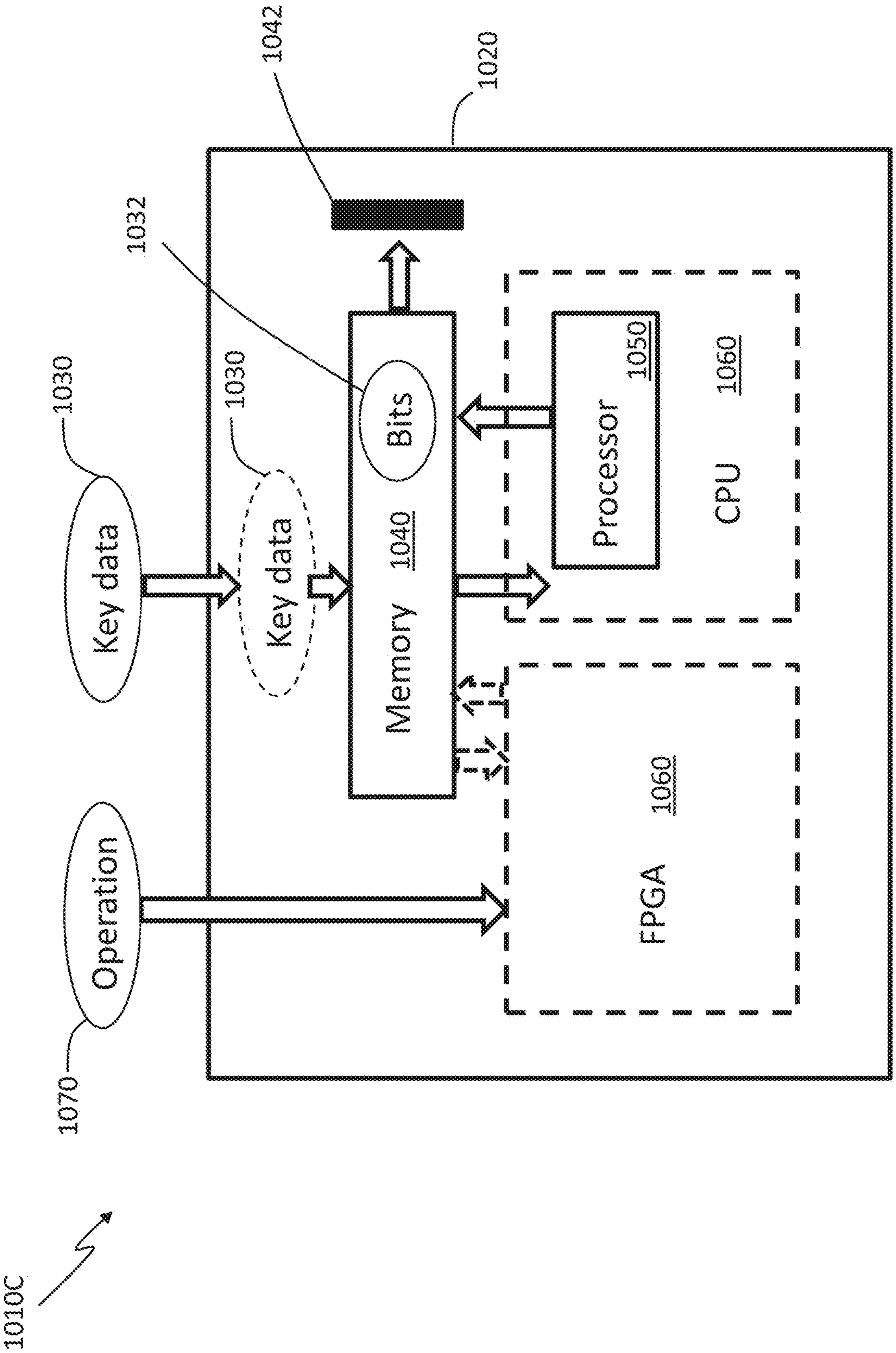
FIG. 10C is a diagrammatical illustration of an improved multimodal IC chip with a combined CPU and FPGA, in accordance with embodiments of the present disclosure.

FIGS. 10A-10C provide three examples of the present disclosure, where FIG. 10A is a diagrammatical illustration of an improved multimodal IC chip with an integrated CPU 1010A, FIG. 10B is a diagrammatical illustration of an improved multimodal IC chip with an integrated FPGA 1010B, and FIG. 10C is a diagrammatical illustration of an improved multimodal IC chip with a combined CPU and FPGA 1010C. As shown in FIGS. 10A-10C, the improved multimodal IC chips 1010A, 1010B, and 1010C each include IC chip 1020 or chip package, which has a structure or chip substrate upon which components are located. The IC chip 1020 is enabled to store a cryptographic key. As shown, the IC chip 1020 may receive key data 1030, and the key bits 1032 of the key data 1030 are stored in a memory 1040 of the IC chip 1020, such as within one or more memory cells of the memory 1040. Loading the key data 1030 with the key bits 1032 on the memory 1040 may be done when the IC chip 1020 is manufactured, or at another point in time prior to use of the IC chip 1020, and typically by a manufacturer or producer of the IC chip 1020. The memory 1040 may be a non-transitory memory device which is positioned on the chip substrate of the IC chip 1020. Once stored on the memory 1040, a processor 1050 or processing system may access the key bits 1032 from the memory 1040.

In conventional memory ICs, the chip leads, e.g., electrical connectors to and from the IC chip, may be used to either read or write to specified memory locations of the IC chip. The improved multimodal IC chips 1010A, 1010B, and 1010C allow for key data 1030 to be received and stored on the memory 1040, which allows the key bits 1032 to be secure, but the IC chip 1020 does not physically allow for the key bits 1032 of key data 1030 to be read out of the IC chip 1020 once stored. For instance, the IC chip 1020 may be free from chip leads or other structural components which allow key data 1030 to be read from the memory 1040, e.g., such that physically, there are no chip leads or other components, which ensures access to the key data 1030 is achieved only through the processor 1050 positioned integral with the IC chip 1020 itself. Without a physical ability to read data on the memory 1040, the key bits 1032 are effectively blocked from being read out of the IC chip 1020, or otherwise accessed on the memory 1040. This is indicated at block 1042 in FIGS. 10A-10C. As such, the key retrieval from the IC chip 1020 is impossible. The use of the key bits 1032 is in encrypting or decrypting data, but those key bits 1032 cannot be otherwise accessed outside of the secure enclave of the IC chip 1020. With the improved multimodal IC chips 1010A, 1010B, and 1010C, even if an unauthorized person, such as an adversary, has physical access to the IC chip 1020 or encryption and decryption hardware which contains the IC chip 1020, they are not able to retrieve any bits of the key since the IC chip 1020 lacks the physical infrastructure to allow the key bits 1032 to be read from the memory 1040 of the IC chip 1020.

In addition to these features, the improved multimodal IC chips 1010A, 1010B, and 1010C include at least one processing device 1060, which is positioned on the chip substrate of the IC chip 1020. The processing device 1060 may encompass the processor 1050, but may be preferably implemented as either a CPU (FIG. 10A), or an FPGA (FIG. 10B), or a combined CPU FPGA (FIG. 10C), or a similar processing device. In all of the improved multimodal IC chips 1010A, 1010B, and 1010C processing of encrypted data can occur on board the IC Chip 1020 and not external to it, such that key data is processable or computable with the at least one processing device 1060 without needing to transmit the encrypted data outside of the IC Chip 1020.

The processing or computation of the encrypted data stored on the IC Chip 1020 may be instructed based on an externally-originating operation 1070, which may be any type of computational instruction which is received from external of the IC Chip 1020. For instance, the externally-originating operation 1070 may be received from an external device to the IC chip 1020, such as devices which are in electronic communication with the improved multimodal IC chip 1010A via any type of communication medium. The externally-originating operation 1070 may be unencrypted or encrypted. It may be provided to the processing device 1060 which retrieves the encrypted data from the memory 1040 on the IC Chip 1020, and processes the encrypted data based on the operation 1070.

The on-board processing or computation of the encrypted data preserves the OTP rule that the plaintext of the encrypted data is never exposed outside of the IC Chip 1020, such that the secured data remains fully secure. At no time is plaintext exposed outside the hardware boundary. Moreover, an externally-originating operation 1070 cannot change the inability to expose the plaintext outside of the secure enclave, since, as previously noted, the improved multimodal IC chips 1010A, 1010B, 1010C lack the physical hardware to allow transmission of the data outside of the IC chip 1020. Additionally, because the processing is completed in the processing device 1060 which is on-board the IC Chip 1020 substrate, desirable processing speeds can be achieved to meet practical requirements. For instance, processing 10,000 values of data with the processing device 1060 can be completed in milliseconds as compared to conventional FHE techniques which can be 100,000× to 1,000,000× slower due to large ciphertexts and complex polynomial operations.

In the example of FIG. 10A, the secure enclave of the IC Chip 1020 utilizes a CPU as the processing device 1060 within a tamper-resistant enclosure. In FIG. 10B, the processing device 1060 is implemented as an integrated FPGA OTP engine. The FPGA OTP engine is capable of performing operations in parallel to a processor 1050, such as by processing data retrieved from memory 1040 in parallel with processor 1050 processing data from memory 1040, thereby providing increased processing speeds. For instance, it may perform multi-bit parallel XOR encryption and decryption, thereby achieving throughputs on the order of hundreds of gigabytes per second. While in the example of FIG. 10B, the FPGA OTP engine operates independently, it is possible to operate the FPGA in parallel with the CPU to achieve higher processing speeds. FIG. 10C illustrates an example where the processing device 1060 has a combined CPU-FPGA architecture, where the CPU and FPGA are operating in parallel. This may be useful to prevent encryption and decryption operations from limiting computational throughput. In the example of FIG. 10C, the CPU may process control flow, algorithms, and application logic. The FPGA engine may handle high-throughput OTP operations, such as real-time, line-rate encryption/decryption, in parallel with the CPU, which can allow for continuous processing without encryption bottlenecks.

Figure 11:
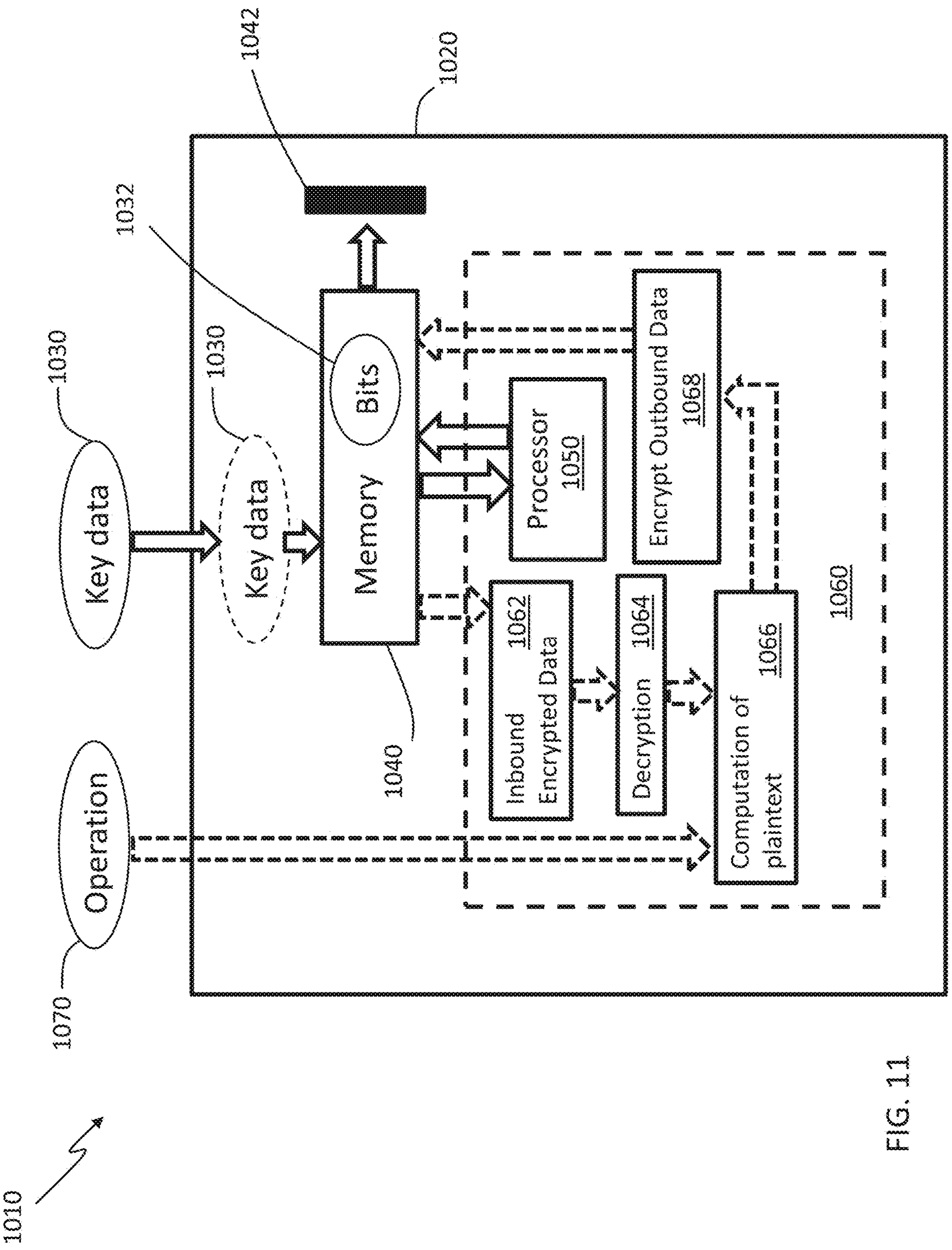
FIG. 11 is a diagrammatical illustration of a computation process using the improved multimodal IC chip of one of FIGS. 10A-10C, in accordance with embodiments of the present disclosure.

FIG. 11 is a diagrammatical illustration of a computation process using the improved multimodal IC chip of one of FIGS. 10A-10C, in accordance with embodiments of the present disclosure. Specifically, FIG. 11 depicts processing of an improved multimodal IC chip 1010, which may be any of the improved multimodal IC chips 1010A, 1010B, and 1010C of FIGS. 10A-10C. FIG. 11 includes many of the features of FIGS. 10A-10C, which are not repeated for brevity in disclosure. As shown, an externally-originating operation 1070 is supplied to the processing device 1060 on the IC Chip 1020. At block 1062, inbound OTP-encrypted data received from memory 1040 may be retrieved by the processing device 1060. The OTP-encrypted data is decrypted entirely within the IC Chip 1020, e.g., within the processing device 1060, using on-chip OTP decryption circuitry, as shown at block 1064. The processing device 1060 may then execute the externally-originating operation 1070 to compute the decrypted data at near-native-speed, as shown at block 1066. Then, the processing device 1060 may encrypt the data to provide encrypted outbound data, at block 1068. Thus, the output data is fully encrypted before it leaves the processing device 1060 or the IC Chip 1020, and the operation received can be run without the conventional delays in processing time. As can be seen, the present disclosure is capable of maintaining information-theoretic OTP security while achieving native processing speeds for secure computation. It removes encryption as a throughput bottleneck, enabling use cases such as real-time analytics, AI inference, and large-scale media processing under unbreakable cryptographic protection.

Using the techniques described relative to FIGS. 10A-11, it is possible to achieve significantly improved processing speeds than have been conventionally available, all without limiting the secured architecture. For example, representative implementations can achieve throughput up to 256 GB/s, enabling sorting of 10,000 values in under 10 milliseconds. This may allow, for example, encrypting or decrypting a 50 GB 4K video file in ~0.2 seconds, which is processing performance unattainable with FHE. Table 1 is provided as additional comparative examples of the processing performance achieved with the subject disclosure:

TABLE 1

Comparative examples of processing performance

| Operation | The Present Invention | PQC Hardware | PQC Software | FHE |
|---|---|---|---|---|
| Sort 10,000 values | 5-10 ms | ~50 ms | ~500 ms | Hours-Days |
| Encrypt/ Decrypt 50 GB 4K movie | ~0.2 s | ~50 s | ~8 min | N/A |
| Encryption throughput | 256 GB/s | 1 GB/s | 100 MB/s | <<1 MB/s |

Figure 12:
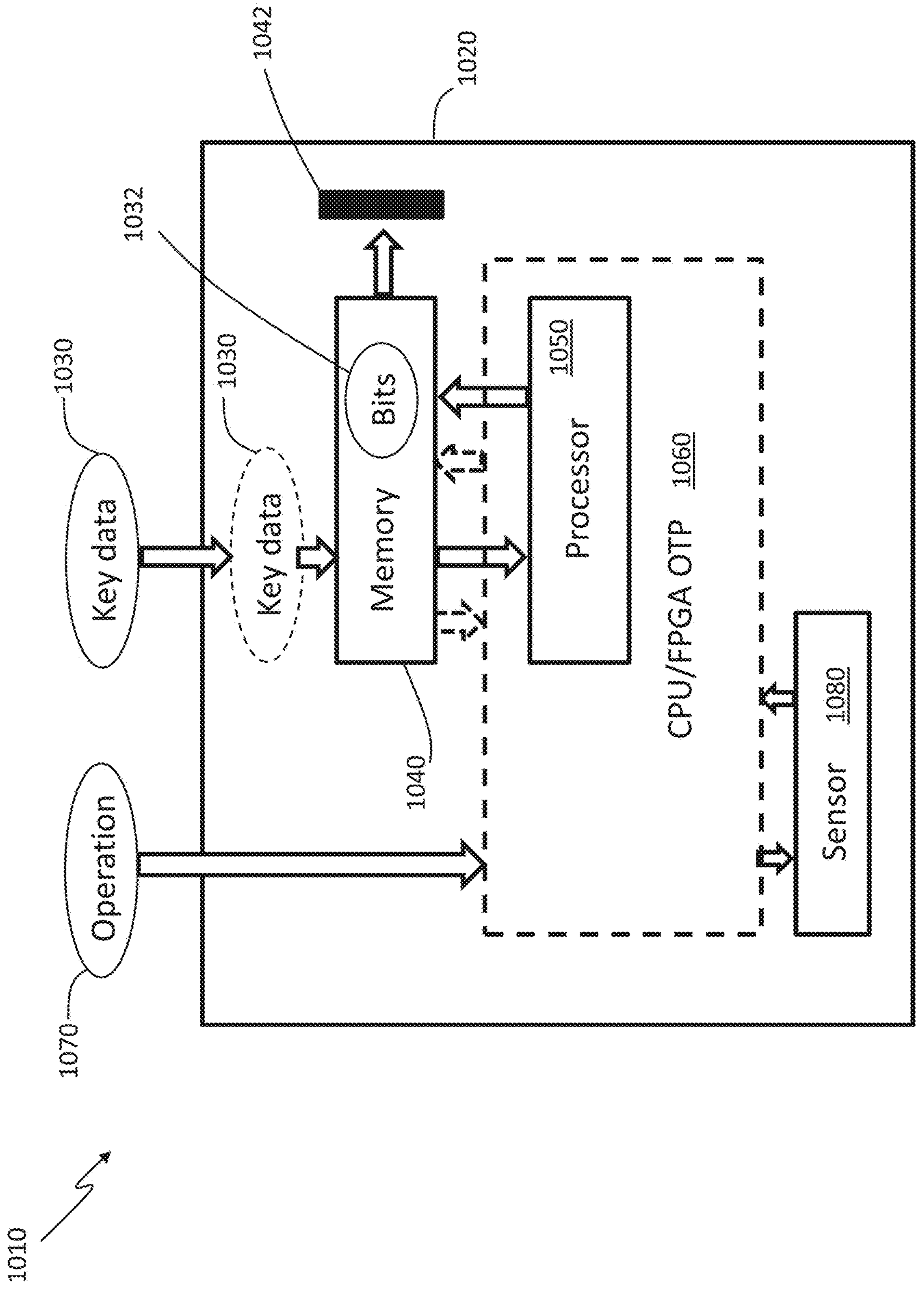
FIG. 12 is a diagrammatical illustration of a computation process using the improved multimodal IC chip of one of FIGS. 10A-10C, in accordance with embodiments of the present disclosure.

It may also be possible to incorporate one or more sensors in the secure enclave of the IC chip 1020 to provide enhanced security and to prevent attempted breaches of the encrypted data. To this end, FIG. 12 is a diagrammatical illustration of a computation process using the improved multimodal IC chip of one of FIGS. 10A-10C, in accordance with embodiments of the present disclosure. Specifically, FIG. 12 depicts an improved multimodal IC chip 1010 with an integrated CPU and/or FPGA OTP 1060, and with a sensor 1080 positioned within the secure enclave of the IC chip 1020. FIG. 12 includes many of the features of FIGS. 10A-10C, which are not repeated for brevity in disclosure.

As depicted in FIG. 12, the sensor 1080 may be positioned within or on IC chip 1020 substrate, such that it is within the secure enclave of the improved multimodal IC chip 1010. The sensor 1080 may be various types of sensing devices, including a camera, a biometric sensor, an electromagnetic sensor, or another type. The use of the sensor 1080 within the IC chip 1020 can provide the ability for a trusted sensing device to be onboard with the IC chip 1020, such that it can be used, when needed, to verify the accuracy of data and prevent nefarious actions to subvert the protections of the improved multimodal IC chip 1010. For instance, the sensor 1080 when embodied as an image sensor, can be used to generate verifiable and unforgeable image provenance of an image processed by the CPU/FPGA OTP 1060, or otherwise included within data on the IC chip 1020. In turn, this ensures that any captured image processed by the CPU/FPGA OTP 1060 is authentic, unaltered, and originated from a trusted hardware source. Thus, the use of the sensor 1080 can further enable high-security data applications that are vulnerable in traditional systems.

While there are various situations where the sensor 1080 can provide added benefits, in one example, the use of the sensor can ensure there is verifiable biometric authentication. For instance, standard facial recognition or fingerprint scanners can be deceived by replay attacks, where an attacker injects a fake video feed or a high-resolution photo to bypass the security. This possibility becomes more prevalent with the growth of AI-enabled content creation which can realistically mimic genuine data. When the sensor 1080 is embodied as a biometric sensor, such as a camera, it can be used to capture the image directly inside the enclave of the IC chip 1020. This ensures that the raw image data never leaves the IC chip 1020, and thus, remains fully secure, and that all feature extraction and matching against stored templates can happen within this secure boundary of the IC chip 1020. Once processed by CPU/FPGA OTP 1060 or processor 1050, the IC chip 1020 then outputs, to the memory 1040, only a cryptographically signed "yes" or "no" result, or similarly binary result indicative of the output. Accordingly, the use of the sensor 1080 ensures that it is physically impossible to spoof or deceive the system by injecting fake data between the sensor 1080 and the processor 1050 or CPU/FPGA OTP 1060. It further ensures that the system can mathematically prove that the processed output of the decision was based on a genuine, authentic, or live image from its trusted sensor 1080.

In another example, the use of the sensor 1080 may ensure that the chain of custody of evidence, such as in law enforcement and legal contexts, is unalterable. Digital evidence from body cameras or surveillance systems can be challenged in legal proceedings as fake or altered, especially with the rise of deepfakes. When the sensor 1080 is embodied as a camera on the IC chip 1020, it is possible to capture video frames directly inside the IC chip 1020. The internal processor 1050 or CPU/FPGA OTP 1060 may then cryptographically sign each frame of the video (or a hash of the frames of the video) along with a secure timestamp. The signed and OTP-encrypted video may then be streamed out for storage in memory 1040. This creates an unbreakable, verifiable chain of custody from the moment of capture, and it provides mathematical proof of the origin, integrity, and time of the video, making the evidence tamper-evident and capable of being legally authenticated.

Any exemplary benefit of the use of the sensor 1080 may be seen within the medical field, such as with secure medical imaging and edge AI processing. Within the healthcare field, medical imaging devices, like endoscopes or ultrasound probes, generate ad process highly sensitive patient data that must be protected to both ensure proper confidentiality to the patient, and to adhere to relevant rules and regulations, such as HIPPA. When the sensor 1080 is embodied as an image sensor, it is possible for the internal processor 1050 or CPU/FPGA OTP 1060 to perform an initial analysis on the image data, or execute an AI inference model (e.g., to detect anomalies) directly on the raw, unencrypted image data. The IC chip 1020 may then output either the encrypted full image or just the encrypted results of the analysis. Thus, in this example, the IC chip 1020 with onboard sensor 1080 provides end-to-end security for sensitive patient data from the point of capture. It also enables secure edge AI, where diagnostics can be run on the device itself without exposing private data to a less secure host computer or network.

Another example can be seen with anti-counterfeiting and supply chain verification. Verifying the authenticity of high-value goods like pharmaceuticals, luxury items, or critical components throughout a supply chain is an essential task to ensure consumer safety and prevent brand dilution. The sensor 1080 may be embodied as a camera which is integrated in a handheld scanner, such that the user could use the scanner to capture an image of a product's unique identifier. This unique identifier could be any type of identifier, such as a QR code, hologram, or even a microscopic surface texture. The image may be processed in the IC chip 1020 by the processor 1050 or the CPU/FPGA OTP 1060 to verify its authenticity, and create a cryptographically signed and time-stamped log entry for the supply chain database. The result is the creation of a trusted and unforgeable audit trail, proving that a specific, trusted device verified an authentic item at a specific location and time. In turn, this can provide a record of quality and compliance with regulatory requirements to the manufacturer of a product.

With regards to FIGS. 10A-13, it is noted that the improved multimodal IC chip 1010 may be beneficial in many settings and for many uses. For instance, in one example, the improved multimodal IC chip 1010 may be used with a secure voting system which tabulates votes, such as those used in political elections or corporate settings, or in other settings where having a tamper-resistant system is desired. In a voting system, use of the improved multimodal IC chip 1010 may allow for votes input to be encrypted immediately upon input to the IC chip 1020. The encryption keys may be stored in WOCU memory, and the multimodal IC chip 1010 may utilize tamper sensors which trigger key zeroization upon the event that a tamper activity is detected. Counting of the votes input may occur within the tamper-resistant enclave of the IC chip 1020, and verifiable receipts may be generated without exposing votes or other sensitive data.

In a similar example, the multimodal IC chip 1010 can be used to secure election tabulation. In this example, the IC chip 1020 may receive OTP-encrypted votes from multiple voting terminals, and the encrypted votes may be decrypted within tamper-resistant hardware of the IC chip 1020. The votes can be counted at native processing speed to achieve an output, and the votes themselves and/or the results of the votes may be reencrypted before transmission from the IC chip 1020. This use may allow for the generation of a cryptographic audit trail, thus allowing for the confirmation or vetting of the accurate results of the election. Similarly, it may also be possible for the people or entities who cast the votes to receive encrypted receipts after voting. These receipts may allow for the public verification of the vote occurring without revealing the contents of the votes, thus providing further confirmation of the integrity of the election without reveling personal or sensitive information.

Figure 13:
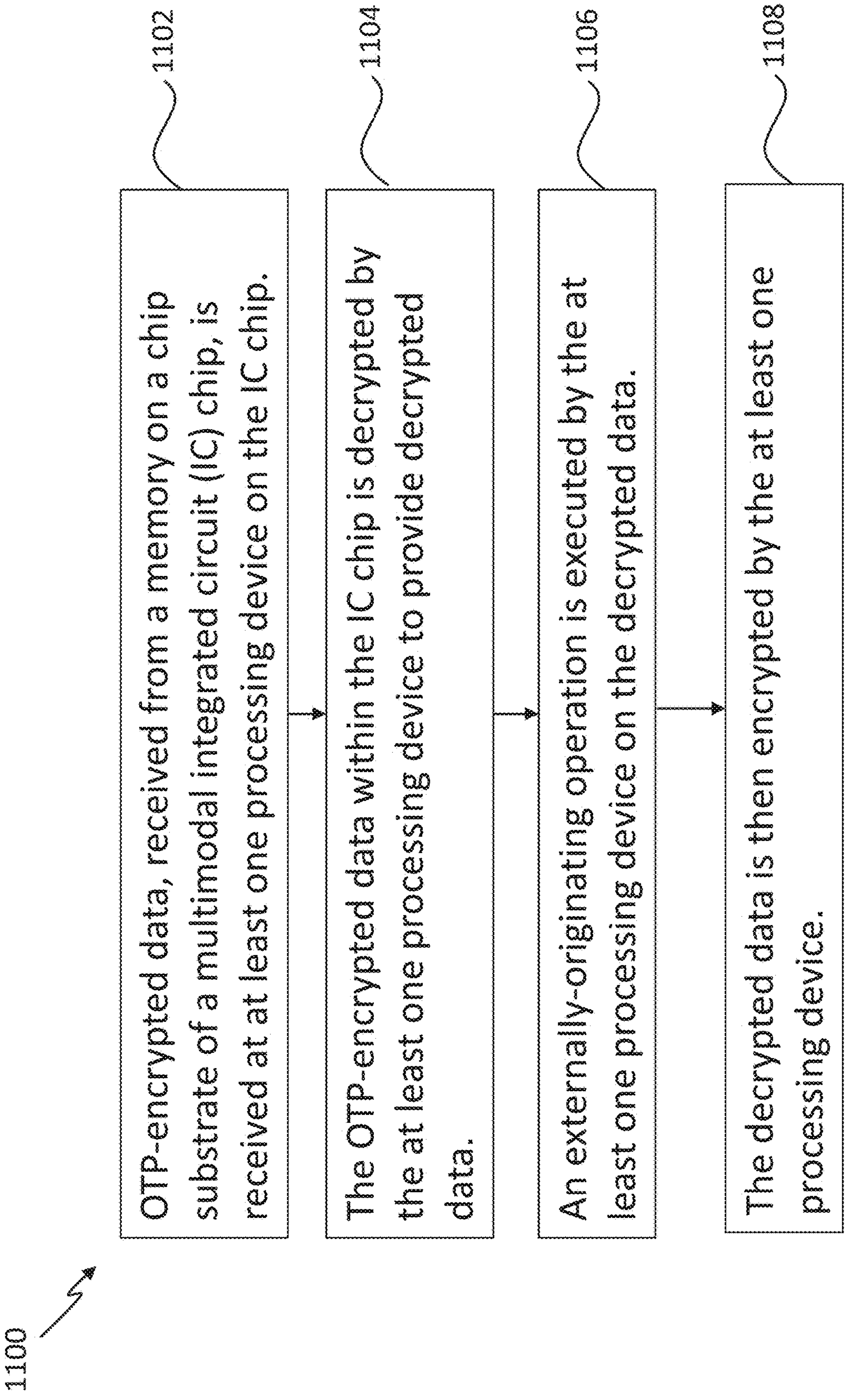
FIG. 13 is a flowchart illustrating a method of native-speed encrypted data processing for use in cryptography, in accordance with the embodiments of the disclosure.

FIG. 13 is a flowchart 1100 illustrating a method of native-speed encrypted data processing for use in cryptography, in accordance with the embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 1102, OTP-encrypted data, received from a memory on a chip substrate of a multimodal integrated circuit (IC) chip, is received at at least one processing device on the IC chip. The OTP-encrypted data within the IC chip is decrypted by the at least one processing device to provide decrypted data (block 1104). An externally-originating operation is executed by the at least one processing device on the decrypted data (block 1106). The decrypted data is then encrypted by the at least one processing device (block 1108). Any number of additional steps, functions, processes, or variants thereof may be included in the method, including any disclosed relative to any other figure of this disclosure.

Figure 14:
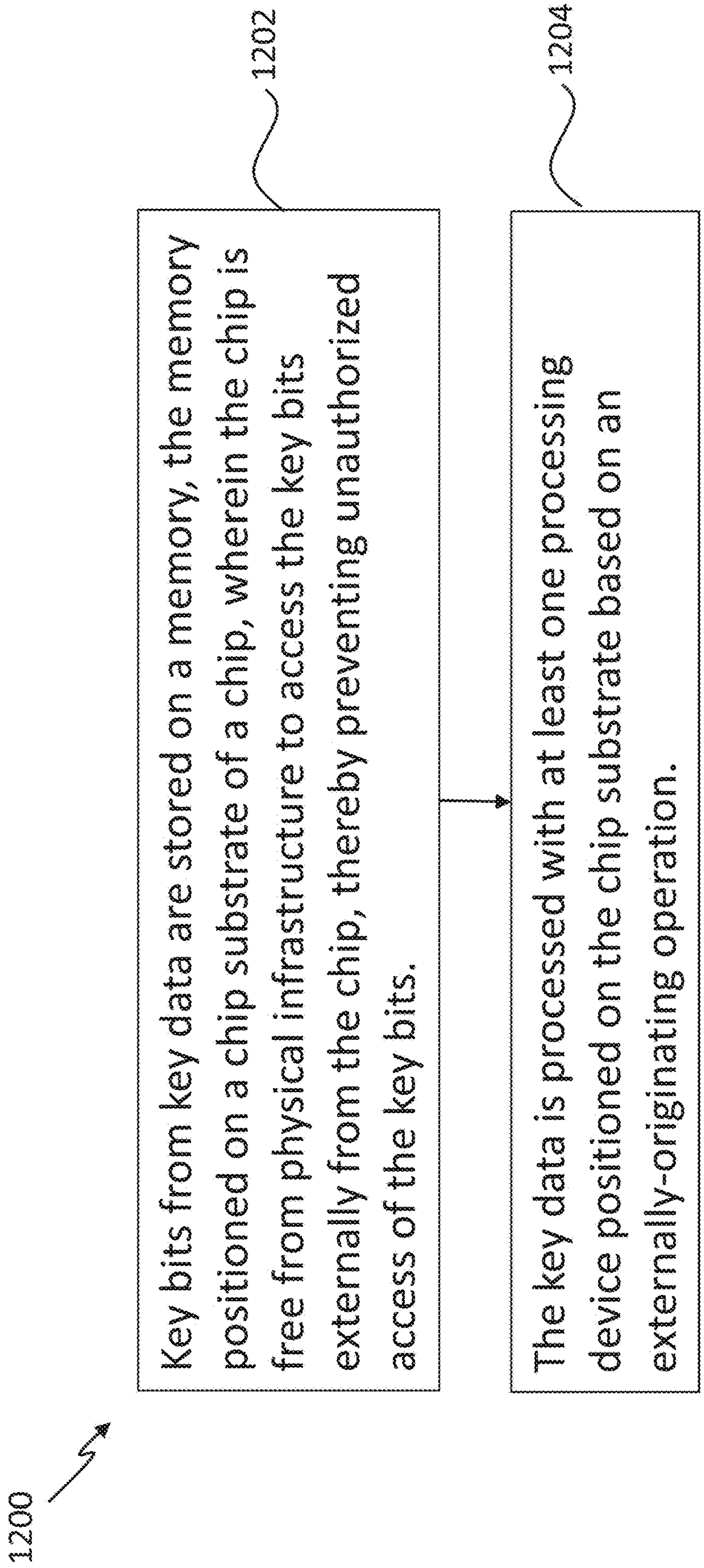
FIG. 14 is a flowchart illustrating a method of native-speed encrypted data processing for use in cryptography, in accordance with the embodiments of the disclosure.

FIG. 14 is a flowchart 1200 illustrating a method of native-speed encrypted data processing for use in cryptography, in accordance with the embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 1202, key bits from key data are stored on a memory, the memory positioned on a chip substrate of a chip, wherein the chip is free from physical infrastructure to access the key bits externally from the chip, thereby preventing unauthorized access of the key bits. The key data is processed with at least one processing device positioned on the chip substrate based on an externally-originating operation (block 1204). Any number of additional steps, functions, processes, or variants thereof may be included in the method, including any disclosed relative to any other figure of this disclosure.

While the present disclosure discusses numerous uses of the technology described, there are yet additional examples of use of the present disclosure, including the following examples.

In a first example, a secure hardware module comprises: a tamper-resistant enclosure; an integrated central processing unit (CPU); one-time pad (OTP) decryption circuitry configured to decrypt inbound data within said enclosure; OTP encryption circuitry configured to encrypt outbound data within said enclosure; and non-volatile key storage isolated from external access.

The first example may further comprise an integrated field programmable gate array (FPGA) OTP engine configured for multi-bit parallel XOR encryption and decryption.

In this example, the CPU and FPGA OTP engine operate in parallel such that encryption and decryption do not limit computational throughput.

In this example, the FPGA OTP engine provides parallel encryption and decryption at a throughput of at least 256 gigabytes per second.

In the first example, computations performed by the CPU comprise sorting, filtering, analytics, artificial intelligence (AI) inference, or other processing on OTP-protected data.

In the first example, the module sorts at least 10,000 values end-to-end, including encryption and decryption, in no more than 10 milliseconds.

In the first example, the module encrypts or decrypts a 50 gigabyte, 4K-resolution video file in no more than 0.2 seconds.

In a second example, a method of performing secure computation on OTP-protected data, comprises: decrypting inbound OTP-encrypted data within a tamper-resistant enclosure using on-chip OTP decryption circuitry; processing the resulting plaintext data with an integrated CPU within the enclosure; and encrypting the processed data using on-chip OTP encryption circuitry before output.

The second example may further comprise offloading OTP encryption and decryption to an integrated FPGA OTP engine within the secure enclosure in parallel with CPU computation.

In a third example, a secure computation module comprises: a tamper-resistant enclosure; at least one processing element integrated within said enclosure; cryptographic circuitry configured to decrypt input data within said enclosure using one-time pad (OTP) encryption; said processing element configured to perform computations on decrypted data without exposing plaintext outside said enclosure; and cryptographic circuitry configured to encrypt computational results before output from said enclosure.

The third example may further comprise: a parallel cryptographic engine configured to perform encryption and decryption operations concurrently with said processing element, wherein said parallel cryptographic engine prevents cryptographic operations from limiting computational throughput.

In the third example, said parallel cryptographic engine comprises at least one of: a field programmable gate array (FPGA), an application-specific integrated circuit (ASIC), a graphics processing unit (GPU), or dedicated cryptographic hardware.

In the third example, said processing element comprises at least one of: a central processing unit (CPU), a microcontroller, a digital signal processor (DSP), or specialized computational hardware.

In the third example, said processing element and cryptographic circuitry are configured to achieve native computational speed on decrypted data while maintaining information-theoretic security.

In the third example, computations performed by said processing element comprise sorting, filtering, analytics, artificial intelligence (AI) inference, or data processing operations on OTP-protected data.

In the third example, said parallel cryptographic engine provides parallel encryption and decryption at a throughput of at least 100 gigabytes per second.

In the third example, said module processes at least 10,000 data values end-to-end, including encryption and decryption, in no more than 50 milliseconds.

In the third example, said module encrypts or decrypts a data file of at least 10 gigabytes in no more than 1 second.

The third example may further comprise non-volatile key storage isolated from external access and integrated within said tamper-resistant enclosure.

In the third example, all intermediate computational results remain within said tamper-resistant enclosure throughout the entire processing operation.

In the third example, said processing element is configured to perform multi-step computational operations entirely within said enclosure without exposing any intermediate plaintext data.

The third example may further comprise: secure key storage integrated within said tamper-resistant enclosure; key management circuitry configured to consume OTP key bits during decryption operations; said key management circuitry configured to prevent reuse of consumed key bits.

In the third example, said OTP encryption uses key bits that are permanently consumed during cryptographic operations within said enclave.

In the third example, said processing element is configured to perform computations on decrypted data regardless of timing, environmental conditions, or external triggers.

In the third example, said parallel cryptographic engine and processing element are configured in at least one of: pipeline architecture, concurrent execution architecture, or interleaved processing architecture.

The third example may comprise: multiple processing elements configured to operate in parallel within said tamper-resistant enclosure; load balancing circuitry configured to distribute computational tasks among said multiple processing elements.

In the third example, all data derived from said OTP-decrypted input remains within said tamper-resistant enclosure until final encryption.

In the third example, said processing element is configured to perform complete computational workflows on OTP-decrypted data without any portion of said workflows occurring outside said tamper-resistant enclave.

In the third example, said module achieves end-to-end processing throughput of at least 1 GB/s including OTP decryption, computation, and re-encryption.

In the third example, cryptographic operations consume less than 50% of total processing time during computational operations.

In the third example, said computational operations comprise at least one of: data sorting, mathematical operations, signal processing, pattern recognition, machine learning inference, or database operations.

In the third example, any data type that can be encrypted using one-time pad encryption may be processed.

The third example may further comprise: input interface circuitry configured to receive OTP-encrypted data through any communication protocol; output interface circuitry configured to transmit OTP-encrypted results through any communication protocol.

In the third example, said cryptographic circuitry supports variable-length OTP keys and variable-length data blocks.

In the third example, said parallel cryptographic engine achieves said throughput using high-bandwidth memory architecture comprising at least one of: high-bandwidth memory (HBM), multiple memory channels, stacked memory interfaces, or advanced memory technologies.

In the third example, said end-to-end processing throughput is achieved using memory subsystems with bandwidth exceeding 200 GB/s.

The third example may further comprise high-speed memory interfaces configured to eliminate memory bandwidth as a performance bottleneck during cryptographic and computational operations.

In a fourth example, a method of secure computation comprises: receiving encrypted data at a tamper-resistant computing device; decrypting said data within a secure boundary using one-time pad encryption keys; performing computational operations on decrypted data entirely within said secure boundary using integrated processing resources; encrypting results of said computational operations before any data crosses said secure boundary; and outputting only encrypted results from said computing device.

The fourth example may comprise performing encryption and decryption operations in parallel with computational operations using a parallel cryptographic engine within the secure boundary.

A fifth example is directed to a method of secure OTP-based computation comprising: continuously maintaining decrypted data processing capability within a tamper-resistant boundary; performing computations immediately upon data decryption without external dependencies.

A sixth example may include a method of secure OTP-based computation comprising: continuously maintaining decrypted data processing capability within a tamper-resistant boundary; performing computations immediately upon data decryption without external dependencies.

The systems and methods of the present disclosure may also include multi-tenant secure computation within a single enclave, which can be used to provide provably unbreakable data security using hardware devices but allow flexibility where multiple parties or entities require access to secured data. To this end, FIGS. 15-18 are flowcharts and diagrammatical illustrations which are directed to multi-tenant secure computation. These figures may be understood with reference to any of FIGS. 1-14, above, the features and functionality of which are not repeated for brevity in disclosure.

Figure 15:
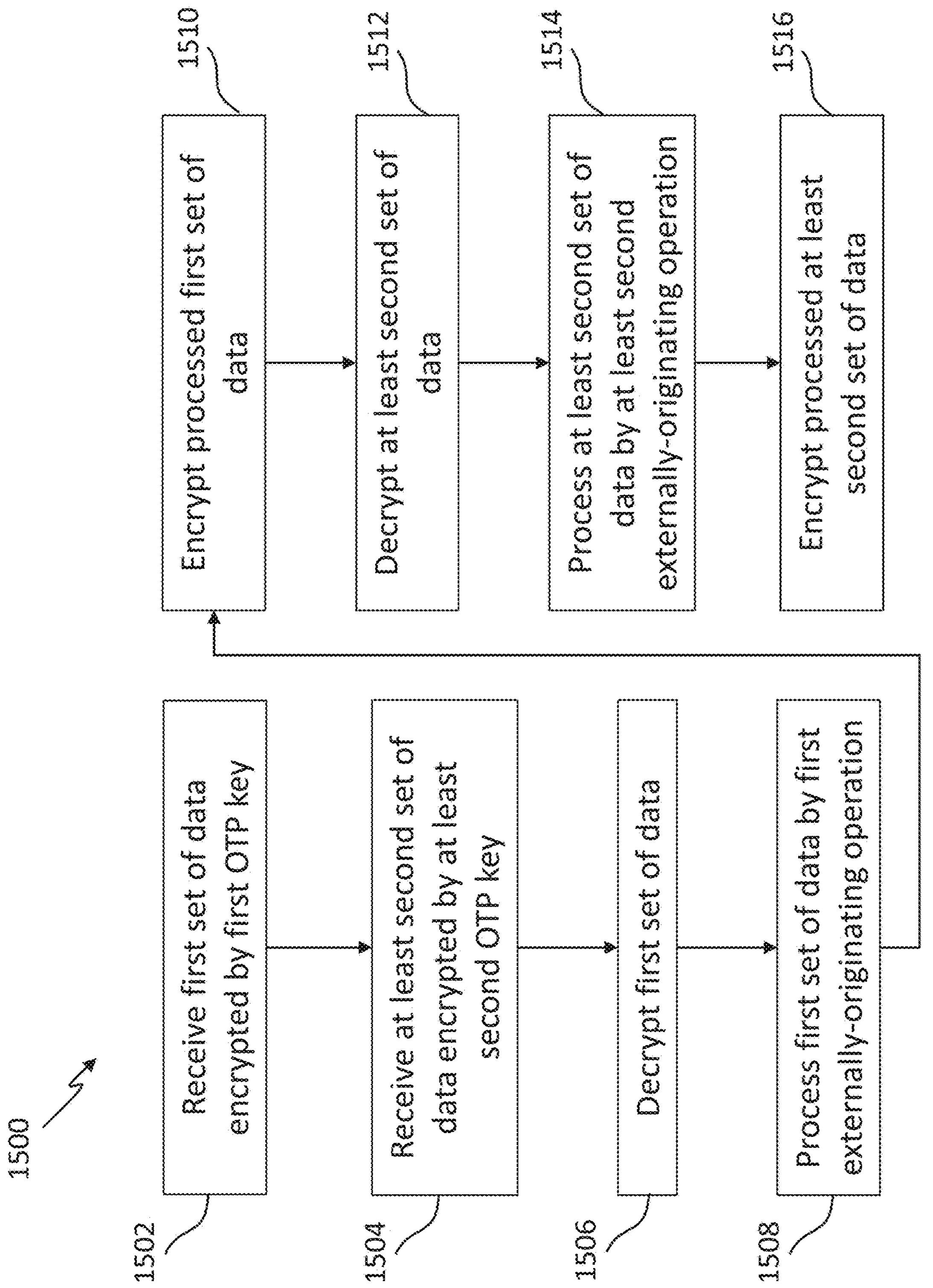
FIG. 15 is a flowchart illustrating a method of isolated encrypted data processing, in accordance with the embodiments of the disclosure.

FIG. 15 is a flowchart 1500 illustrating a method of isolated encrypted data processing, in accordance with the embodiments of the disclosure. As is shown by block 1502, a first set of data from a memory on a chip substrate of a multimodal integrated circuit (IC) chip is received on at least one processing device of the IC chip. The first set of data is encrypted by a first OTP key. At least a second set of data from the memory is received on the at least one processing device, per block 1502. The at least second set of data is encrypted by at least a second OTP key, per block 1504. The first and second data sets may be from independent data sources. As shown by block 1506, the at least one processing device decrypts the first set of data, and a first externally-originating operation on the at least one processing device processes the decrypted first set of data in block 1508.

As is shown by block 1510, the at least one processing device decrypts the processed first set of data, and the at least one processing device decrypts the at least second set of data at block 1512. At block 1514, at least a second externally-originating operation on the at least one processing device processes the decrypted at least second set of data. As is shown by block 1516, the at least one processing device decrypts the processed at least second set of data.

It is noted that the first and/or second set of data received at the IC chip may be received from various entities or tenants. These tenants may be identified to maintain a record of where the input data is from, and where it may be sent to when output from the IC chip. The tenants may be given corresponding identifications, such as explicit tenant identifiers, tenant keychains, or similar assigned or provided features which can be used by the IC chip to identify the tenant or the data received from or provided to the tenant.

The method of isolated encrypted data processing described relative to FIG. 15 can have numerous uses and applications. For instance, in one example, at least a third externally-originating operation on the at least one processing device processes the first and at least second sets of data while the processed first and at least second sets of data are in a decrypted state. This may allow the processed first and second sets of data to be combined to yield a result incorporating multiple datasets, even when the underlying data sets are from independent data sources. The at least third externally-originating operation may be a process or instruction set for combining the processed first and at least second sets of data.

In another example, the method may be used to guarantee the privacy of isolated data sets stored on separate partitions of the memory. In this situation, multiple data sets are stored within partitions on the memory. Each data set is encrypted using a unique OTP key. The IC chip processes data from each partition individually by decrypting the data from the partition, applying an externally-originating operation to the data, encrypting the processed data, and storing the encrypted processed data on the partition. In the example, the IC chip processes data from a first partition in this manner, then a second partition, then a third partition, and so on.

In yet another example, the method may be used to process sensitive data, such as medical data which originates from multiple healthcare sources. For instance, in order to make a medical diagnosis, isolated patient data, isolated pharmaceutical database data, and isolated genetic research data may be used or required. Each source of data may be received by the IC chip, stored in a separate partition on the memory of the IC chip, and may be encrypted. In this example, the operations used in processing the data are applied to each data set independently, without exposing the data in one set to the data in any other set, such that the individual data sets remain isolated. The results may then be cryptographically combined. The result may be that no single party is capable of seeing all of the sources of data, yet the computation will produce a unified output. The unified output may be transmitted to one party or entity, or multiple parties or entities. For instance, the output may include an outflow to multi-tenants, which may include any number of entities, such as the various healthcare sources in this example, or to any other entities in other examples.

In a similar example, the method may be used for situations with competitive intelligence without exposure. For instance, two companies may both contribute encrypted data, which may be stored in separate key partitions. Based on this data, aggregate statistics, such as industry benchmarks, trend analysis, or similar computational data may be computed within the enclave. Neither company is able to see the other's data, but the aggregate results are released. As such, the method can provide provable non-collusion between the companies, since the hardware enclave architected enforces that one key partition cannot access a separate or distinct data feed. Thus, the method can provide for computing aggregate functions over multiple encrypted data sources where cryptographic partition isolation provides mathematical proof that no participant accessed another's data.

In another example, the method may be used to track and limit the outflow of data from one or more of the memory partitions. Here, the IC chip may be configured with one or more fault injection components in communication with or on the memory. The fault injection components may include electrical components, such as power sources, resistors, capacitors, and the like. The fault injection components may be configured to inject a noise or fault signal to the memory when a partition is accessed. The noise or fault signal may include a high or low voltage signal, a signal causing extreme temperature, an electromagnetic pulse, and the like. One or more applications of the noise or fault signal may cause the receiving portion of the memory to fail or reset. In one example, the memory may zeroize or oneize upon receipt of a threshold number of fault signals.

In the example, each instance of access to a partition causes the fault injection components to inject a fault signal to the partition. Each partition has a privacy budget, and each partition tracks the access to and outflow of each partition. This may include the number of accesses, the amount of data accessed, and the amount of time for which access has been granted. In the example, when the privacy budget has been exhausted for a partition, the OTP key on the partition is deleted due to the fault injection. This prevents further access to the encrypted data.

In another example, the method may be used to enable secure federated learning for machine learning models based on data from different entities. For instance, several entities such as hospitals upload patient data to partitions on the memory. The patient data remains isolated and OTP encrypted on each partition. The machine learning model may access each partition's data in isolation in order to train the model. None of the hospital entities are provided access to the patient data of any other hospital. In this example, the cryptographic separation of the data partitions provides mathematical proof that gradients from one partition did not leak information about any other partition. In this way, the machine learning model is gradient-isolated.

In another example, the method may be used to enable audit trails with selective disclosure. Multiple sets of data may be loaded onto the memory and isolated and OTP encrypted on separate partitions. The processing may be performed as described herein. The processing device also generates an audit log for each of the processed sets of data. The audit log shows what operations were performed for each set of data. In the example, each audit log is encrypted using a corresponding OTP key, and stored within the corresponding partition. A user auditing the operations of a particular partition need only access the audit log stored within that partition. The auditor can verify that processing occurred correctly without seeing the actual data. This provides cryptographic proof of computation integrity across all partitions.

In another example, the method may be used to secure data markets in real-time. Data providers may dynamically allocate partitions on the memory and may load their OTP-encrypted data to the partitions as desired. The data providers may allow access to the data on one or more partitions to users. Users may submit queries to access the one or more partitions. The queries may be encrypted. In the example, the IC chip may track which queries accessed which partitions. In response to a query, the IC chip may direct or may allow an external processing device to direct payment from the users to the data providers based on the provided access. The data providers can revoke access to any partition by deleting the OTP key at any time.

Another example relates to verifying computations for untrusted environments. In particular, a partition of the memory may contain encrypted test vectors which will allow a user to verify that the computations performed by the IC chip are accurate. The computations may be processed on data from OTP-encrypted partitions as described herein. The IC chip may self-verify the results of the computations against the test vector data on the test vector partition. The IC chip outputs cryptographic proof that the correct algorithm was executed. If an operator of the IC chip enclave attempted to run modified or malicious code, this will be apparent based on the audit.

In another example, the method may be used to monitor or detect intrusions to the IC chip. Data from multiple sources is loaded onto the memory in separate OTP-encrypted partitions. An observation partition is used to monitor and analyze the traffic on the IC chip. Externally-originating operations directed to the data on the OTP-encrypted partitions are recorded. The recorded observations are encrypted and stored on the observation partition using an observation OTP key. An auditor reviews the recorded observations to detect anomalous computation patterns that might indicate attempted cross-partition attacks, compromised externally originating operations, or unexpected generalization across domains due to AGI.

Figure 16:
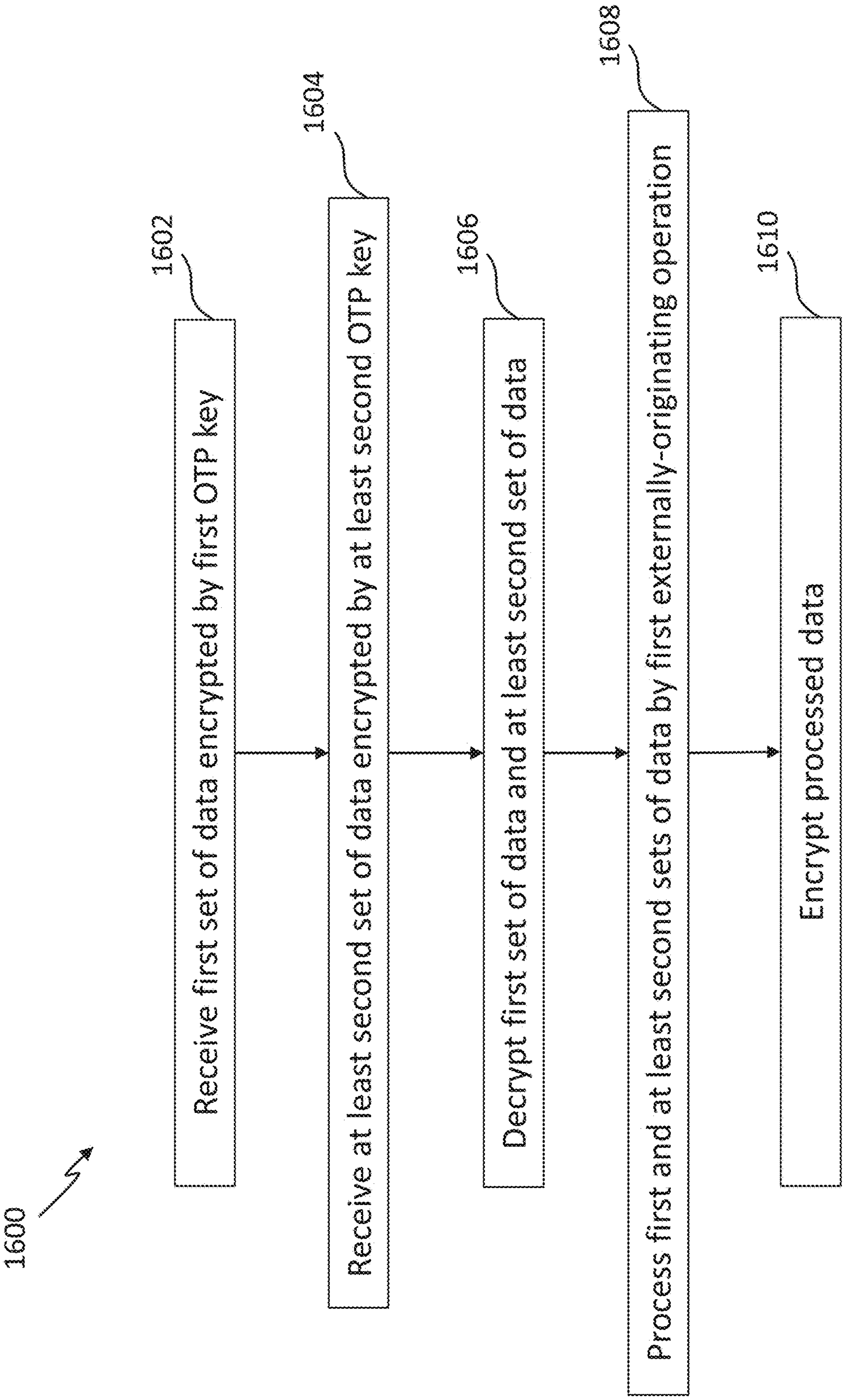
FIG. 16 is a flowchart illustrating a method of mixed encrypted data processing for use in cryptography, in accordance with the embodiments of the disclosure.

FIG. 16 is a flowchart 1600 illustrating a method of mixed encrypted data processing for use in cryptography, in accordance with the embodiments of the disclosure. As is shown by block 1602, a first set of data from a memory on a chip substrate of a multimodal integrated circuit (IC) chip is received on at least one processing device of the IC chip. The first set of data is encrypted by a first OTP key. At least a second set of data from the memory is received on the at least one processing device, per block 1604. The at least second set of data is encrypted by at least a second OTP key. At block 1606, the at least one processing device decrypts the first set of data and the at least second set of data, and at block 1608, a first externally-originating operation on the at least one processing device processes the decrypted first and at least second sets of data. As shown by block 1610, the at least one processing device decrypts the processed data.

The method of mixed encrypted data processing for use in cryptography described relative to FIG. 16 can have numerous uses and applications. In one example, the method may enable secure processing of data corresponding to intervals of time, such as data from calendar years and the like. Data from multiple intervals of time may be loaded onto OTP-encrypted partitions on the memory. The data may be processed as described above, which may allow the analysis of historical trends without mixing data within different time periods. As such, any compromised partitions will not affect the data on any other partitions. This enables a "what-if" analysis on historical data without contaminating other operations directed to current data.

In another example, the method may enable hierarchical security clearances through hardware. In this example, memory partitions may be established based on security access tiers, such as secret clearance levels and privilege access levels. The security access tiers may generally extend from lower access tiers to higher access tiers. For instance, a secret clearance level security access tier system may span confidential, secret, and top secret access levels, with each being correlated to a partition. The processing device can process data from all security access tiers, and therefore from all partitions on the memory. The security access tier may be identified by the processing device.

In the example, data having a lower privilege security access tier is prevented from operating on decrypted data having a high privilege security access tier. In the case of secret clearance levels, data having a confidential designation is prevented from operating on data having a secret or top secret designation. However, data having a top secret designation is allowed to operate on data having a secret or confidential designation. After the data is processed, the security access tier of the processed data may be identified. The outputs are tagged with appropriate clearance information in this way. The output of the processed data is controlled based on the identified security access tier. This prevents inadvertent classification spillage through computation.

Figure 17:
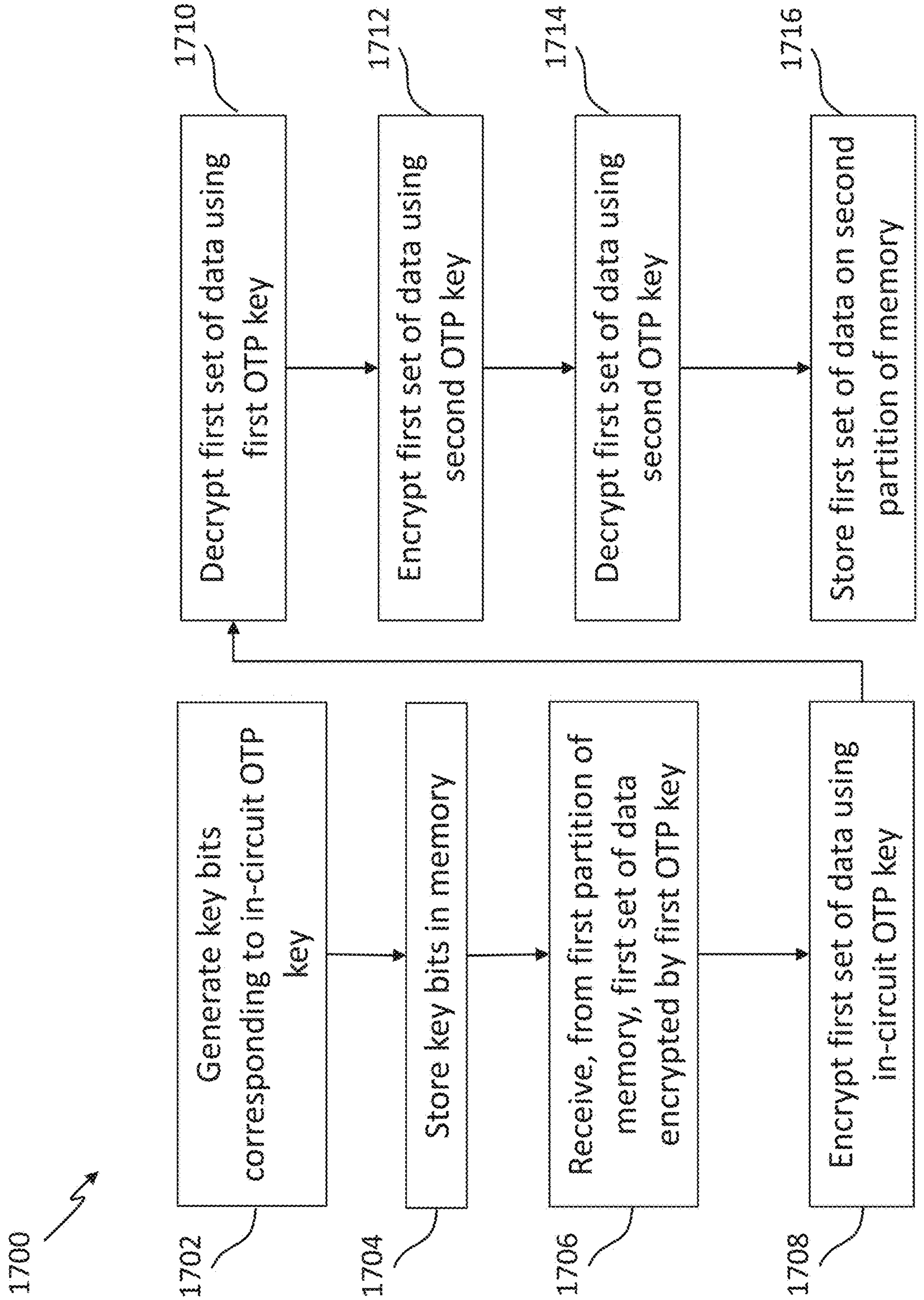
FIG. 17 is a flowchart illustrating a method of in-circuit quantum key distribution, in accordance with the embodiments of the disclosure.

FIG. 17 is a flowchart 1700 illustrating a method of in-circuit quantum key distribution, in accordance with the embodiments of the disclosure. As is shown by block 1702, a TRNG stored on a memory on a chip substrate of a multimodal integrated circuit (IC) chip generates key bits corresponding to an in-circuit OTP key. The key bits of the in-circuit OTP key are stored in the memory, per block 1704. At block 1706, a first set of data from a first partition of the memory is received on at least one processing device of the IC chip. The first set of data is encrypted by a first OTP key, and at block 1708, the at least one processing device encrypts the first set of data using the in-circuit OTP key. The at least one processing device may decrypt the first set of data using the first OTP key at block 1710. At block 1712, the at least one processing device encrypts the first set of data using a second OTP key. The at least one processing device decrypts the first set of data using the in-circuit OTP key, per block 1714. At block 1716, the first set of data encrypted by the second OTP key is stored on a second partition of the memory.

Similar to FIGS. 15-16, there exists various uses and applications for the method of FIG. 17. For instance, in one example, the method may enable the sharing of information through the distribution of quantum keys within the IC chip (in-circuit). Multiple partitions are established on the memory. Each partition is OTP-encrypted with a separate OTP key. In order to securely share information from one partition to another, a TRNG generates an in-circuit OTP key and stores the key bits on the memory. Encrypted data from the first partition is encrypted with the in-circuit OTP key, then decrypted with the OTP key corresponding to the partition. The data is encrypted with the OTP key corresponding to the recipient partition, then decrypted with the in-circuit OTP key. In this way, the data from one partition is transferred to another partition without ever having been plaintext, even on the IC chip. This enables secure communication between narrow partitions within the enclave. Audit logs as described herein can prove that no eavesdropping occurred. Tamper detection as described herein can prove that the quantum key distribution was not observed.

Figure 18:
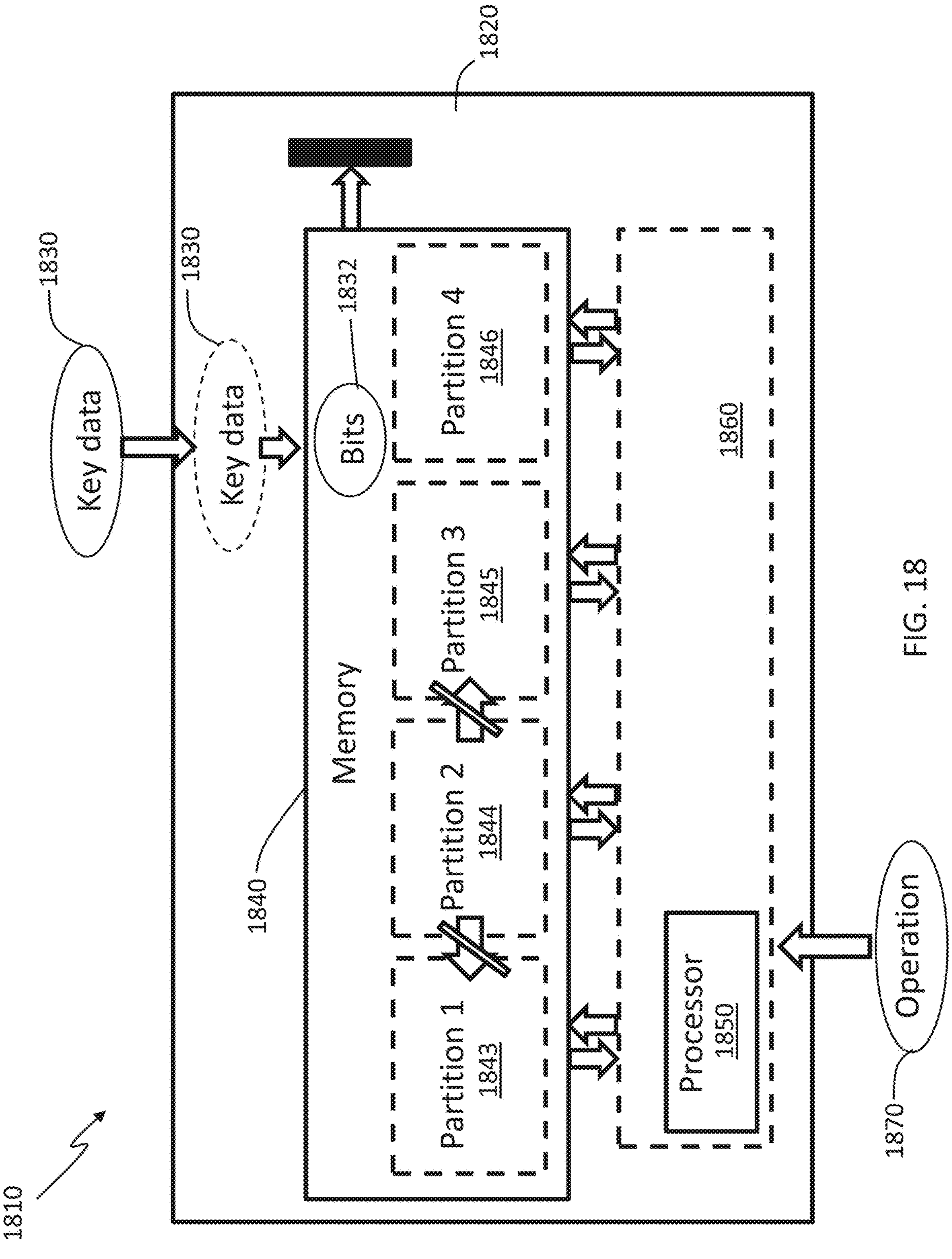
FIG. 18 is a diagrammatical illustration of a multimodal IC chip for intelligence containment, in accordance with the embodiments of the disclosure.

FIG. 18 is a diagrammatical illustration of a multimodal IC chip 1810 for intelligence containment, in accordance with the embodiments of the disclosure. The multimodal IC chip 1810 includes a chip substrate. A memory 1840 is positioned on the chip substrate. The memory 1840 may be a non-transitory memory or another type of memory. When key bits 1832 from key data 1830 are stored on the memory 1840, unauthorized access of the key bits 1832 is prevented. A plurality of partitions 1843, 1844, 1845, 1846 is formed within the memory 1840. At least one partition 1843 is encrypted. At least one processing device 1860 is positioned on the chip substrate. The at least one processing device 1860 prohibits access of the at least one encrypted partition 1843 by at least one other partition 1844 without an externally-originating verification operation 1870.

As shown in FIG. 18, the multimodal IC chip 1810 includes IC chip 1820 or chip package, which has a structure or chip substrate upon which components are located. The IC chip 1820 is enabled to store a cryptographic key. The IC chip 1820 may receive key data 1830, and the key bits 1832 of the key data 1830 are stored in the memory 1840 of the IC chip 1820, such as within one or more memory cells of the memory 1840. Loading the key data 1830 with the key bits 1832 on the memory 1840 may be done when the IC chip 1820 is manufactured, or at another point in time prior to use of the IC chip 1820, and typically by a manufacturer or producer of the IC chip 1820. The memory 1840 may be a non-transitory memory device which is positioned on the chip substrate of the IC chip 1820. Once stored on the memory 1840, a processor 1850 or processing system may access the key bits 1832 from the memory 1840.

As described with respect to FIGS. 10A-10C, previously, the multimodal IC chip 1810 allows secure receipt and storage of the key data 1830 and does not allow key bits 1832 of key data 1830 to be read out of the IC chip 1820 once stored.

In addition to these features, the improved multimodal IC chip 1810 includes at least one processing device 1860, which is positioned on the chip substrate of the IC chip 1820. The processing device 1860 may encompass the processor 1850, and may be implemented as a CPU, an FPGA, or a combined CPU FPGA, or a similar processing device. Processing of encrypted data occurs on board the IC Chip 1820 and not external to it, such that key data is processable or computable with the at least one processing device 1860 without needing to transmit the encrypted data outside of the IC Chip 1820.

The memory 1840 may be partitioned into a plurality of memory partitions 1843, 1844, 1845, 1846. FIG. 18 illustrates four memory partitions, but any suitable number and arrangement of partitions may be included within the scope of this disclosure. The memory partitions 1843-1846 may isolate and contain data that is to be maintained separate from data in the other partitions 1843-1846. In one example, at least one partition 1843 may be encrypted, for instance, using key bits 1832 of the key data 1830 stored on the memory 1840. This encryption may prevent data or processes stored on at least one partition 1843-1846 from accessing data or processes stored on the encrypted partition 1843. The processing or computation of the encrypted data stored on the IC Chip 1820 may be instructed based on an externally-originating verification operation 1870, which may be any instruction received from a source external to the IC Chip 1820 encrypted with an OTP key corresponding to the encrypted partition 1843. For instance, if one partition 1844 seeks access to another partition 1843, the seeking partition 1844 may send a request for an external user to grant access. The external user may send an externally-originating verification instruction 1870 containing or encrypted with the OTP key corresponding to the encrypted partition 1843, and the seeking partition 1844 may be granted access.

In the context of AGI, the cognitive processes of the AGI may be distributed across a plurality of memory partitions. In the example in FIG. 18, the cognitive processes are distributed across four memory partitions 1843-1846, which correspond to a perception partition 1843 (input processing), a reasoning partition 1844 (decision-making), an action partition 1845 (output generation), and a self-modification partition 1846 (proposals to modify the operation of the AGI). The perception partition 1843 may contain instructions and data to enable the AGI to receive, seek, and process input data. The reasoning partition 1844 may contain instructions and data to enable the AGI to interpret the input data. The action partition 1845 may contain instructions and data to enable the AGI to perform one or more actions in response to the interpretation of the reasoning partition. The self-modification partition 1846 may contain instructions and data to enable the AGI to modify its own processes.

In this example, the partitioning of the memory 1840 may create a hardware-enforced cognitive bottleneck which may constrain the behavior of the AGI. When access to one or more partitions 1843-1846 is restricted, the AGI is not able to modify itself without external approval allowing it to cross partition boundaries. In this example, the reasoning partition 1844 is restricted from accessing the action partition 1845 because the action partition 1845 is encrypted or contains encrypted data. If the reasoning partition 1844 determines that access to the action partition 1845 is required, it must request access from an outside user, which may be a human user or an external machine. The outside user may send a verification instruction 1870 to the processing device 1860 granting access to the action partition 1845. The verification instruction 1870 may contain sufficient information to allow the data on the encrypted action partition 1845 to be decrypted, and access gained, for a limited window. This limited window may include a single operation or point of access, a grouping of operations, a time-limited window, and the like.

In this example, the AGI may be prevented from performing recursive self-improvement. Any self-modification proposals originating from the self-modification partition 1846 may be communicated to an external user. In one example, the proposals may be encrypted before leaving the partition 1846. The external user may review and allow or deny the proposal and subsequent access to the one or more encrypted partitions 1843-1845 on the memory 1840. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of native-speed encrypted data processing for use in cryptography, the method comprising:
- receiving, from a memory on a chip substrate of a multimodal integrated circuit (IC) chip, a first set of data on at least one processing device of the IC chip, the first set of data encrypted by a first OTP key;
- receiving, from the memory, at least a second set of data on the at least one processing device, the at least second set of data encrypted by at least a second OTP key;
- decrypting, by the at least one processing device, the first set of data;
- processing, by a first externally-originating operation on the at least one processing device, the decrypted first set of data;
- encrypting, by the at least one processing device, the processed first set of data;
- decrypting, by the at least one processing device, the at least second set of data;
- processing, by at least a second externally-originating operation on the at least one processing device, the decrypted at least second set of data; and
- encrypting, by the at least one processing device, the processed at least second set of data.

2. The method of claim 1, further comprising processing together, by at least a third externally-originating operation on the at least one processing device, the processed first and at least second sets of data while the processed first and at least second sets of data are in a decrypted state.

3. The method of claim 1, further comprising introducing, by a fault injection component on the memory, a fault signal to a portion of the memory corresponding to the first set of data or the at least second set of data upon decryption of the first set of data or the at least second set of data, wherein the fault signal corresponds to a threshold access value, and wherein the portion of the memory is configured to zeroize or oneize upon receipt of a threshold number of fault signals.

4. The method of claim 1, wherein the first and at least second externally-originating operations are directed to training a machine learning model, and wherein the machine learning model is gradient-isolated.

5. The method of claim 1, further comprising:
- generating, by the at least one processing device, an audit log for each of the processed first and at least second sets of data; and
- encrypting, by the at least one processing device, each audit log using one of the first or at least second OTP keys.

6. The method of claim 1, wherein the first and at least second externally-originating operations correspond to encrypted queries from at least one user to access the first and at least second sets of data.

7. The method of claim 6, further comprising:
- tracking, by the at least one processing device, access to each of the first and at least second sets of data provided to each of the at least one users; and
- directing, by the at least one processing device, payment from each of the at least one users based on the provided access.

8. The method of claim 1, further comprising the steps of:
- receiving, from the memory, a set of test vector data; and
- verifying, by the at least one processing device, correct execution of the first or at least second externally-originating operation against the test vector data.

9. The method of claim 1, further comprising:
- recording, by the at least one processing device, the first and at least second externally-originating operations; and
- encrypting, by the at least one processing device, the recorded observations to an observation partition of the memory using an observation OTP key.

10. The method of claim 9, further comprising analyzing, by the at least one processing device, the recorded observations to detect anomalous computation patterns.

11. A method of native-speed encrypted data processing for use in cryptography, the method comprising:
- receiving, from a memory on a chip substrate of a multimodal integrated circuit (IC) chip, a first set of data on at least one processing device of the IC chip, the first set of data encrypted by a first OTP key;
- receiving, from the memory, at least a second set of data on the at least one processing device, the at least second set of data encrypted by at least a second OTP key;
- decrypting, by the at least one processing device, the first set of data and the at least second set of data;
- processing, by a first externally-originating operation on the at least one processing device, the decrypted first and at least second sets of data; and
- encrypting, by the at least one processing device, the processed data.

12. The method of claim 11, wherein the first and at least second sets of data correspond to intervals of time.

13. The method of claim 11, wherein the first and at least second sets of data correspond to security access tiers, and further comprising the step of identifying, by the at least one processing device, a security access tier of the first set of data and a security access tier of the at least second set of data, wherein decrypted data having a lower privilege security access tier is prevented from operating on decrypted data having a higher privilege security access tier.

14. The method of claim 13, further comprising the steps of:
- identifying, by the at least one processing device, a security access tier of the processed data; and
- restricting, by the at least one processing device, an output of the processed data based on the identified security access tier.

15. A multimodal integrated circuit (IC) chip with native-speed encrypted data processing for use in cryptography, the IC chip comprising:
- a chip substrate;
- a memory positioned on the chip substrate, wherein when key bits from key data are stored on the memory, unauthorized access of the key bits is prevented;
- a plurality of partitions within the memory, wherein at least one partition is encrypted; and
- at least one processing device positioned on the chip substrate, wherein the at least one processing device prohibits access of the at least one encrypted partition by at least one other partition without an externally-originating verification operation.

16. The IC chip of claim 15, wherein the plurality of partitions within the memory correspond to a cognitive process of an Artificial General Intelligence (AGI), and wherein the cognitive process comprises perception, reasoning, action, and self-modification.

17. The IC chip of claim 16, wherein a partition corresponding to reasoning is prohibited by the at least one processing device from accessing a partition corresponding to action without an externally-originating verification operation.

18. The IC chip of claim 16, wherein a partition corresponding to self-modification is prohibited by the at least one processing device from accessing any other partition without an externally-originating verification operation.

* * * * *